US012697737B2

(12) United States Patent
Brown et al.

(10) Patent No.: US 12,697,737 B2
(45) Date of Patent: Aug. 4, 2026

(54) SYSTEM AND/OR METHOD FOR REFILLING ASSEMBLY SYSTEMS

(71) Applicant: Chef Robotics, Inc., San Francisco, CA (US)

(72) Inventors: Kody Brown, San Francisco, CA (US); Rajat Bhageria, San Francisco, CA (US); Weston Wahl, San Francisco, CA (US); Xinyi Daniel Tang, San Francisco, CA (US); Jamie Delton, San Francisco, CA (US); Clement Creusot, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 605 days.

(21) Appl. No.: 18/114,892

(22) Filed: Feb. 27, 2023

(65) Prior Publication Data

US 2023/0278229 A1 Sep. 7, 2023

Related U.S. Application Data

(60) Provisional application No. 63/335,635, filed on Apr. 27, 2022, provisional application No. 63/315,647, filed on Mar. 2, 2022.

(51) Int. Cl.
*B25J 11/00* (2006.01)
*B25J 9/16* (2006.01)
(Continued)

(52) U.S. Cl.
CPC ......... *B25J 11/0045* (2013.01); *B25J 9/1687* (2013.01); *B25J 13/085* (2013.01); *B25J 21/00* (2013.01)

(58) Field of Classification Search
CPC ........... B65B 6/068; B65B 5/08; B65B 5/105; B65B 43/54; B65B 65/003; B25J 11/0045;
(Continued)

(56) References Cited

U.S. PATENT DOCUMENTS 3,300,945 A * 1/1967 Grossi ..................... B65B 35/38
53/448
5,218,812 A * 6/1993 Ventura ................. B65B 25/046
53/448
(Continued)

FOREIGN PATENT DOCUMENTS

EP 3810375 B1 * 8/2024 ........... G05B 19/418
JP 2003128002 * 5/2003 ............. B65B 5/105
(Continued)

*Primary Examiner* — Linda J. Hodge
(74) *Attorney, Agent, or Firm* — Jeffrey Schox; Evan Myers

(57) ABSTRACT

The system can include: a base structure, a set of support elements, and/or any other suitable components. The system can optionally include a foodstuff bin and a force sensor. However, the system can additionally or alternatively include any other suitable set of components. The system functions to facilitate refilling of ingredients within foodstuff bins and/or replacement of foodstuff bins. Additionally or alternatively, the system can function to facilitate repeatable positioning of foodstuff bins within a workspace of the robotic arm and/or a robotic assembly module. Additionally or alternatively, the system can function to facilitate rapid calibration, servicing, and/or cleaning of foodstuff assembly modules.

16 Claims, 25 Drawing Sheets

100

(51) Int. Cl.
    *B25J 13/08*              (2006.01)
    *B25J 21/00*              (2006.01)
(58) Field of Classification Search
    CPC ........ B25J 9/1687; B25J 13/085; B25J 21/00;
                        B25J 9/0096; B25J 9/0018
    USPC .................................. 53/390, 393, 249, 235
    See application file for complete search history.

(56)                    References Cited

U.S. PATENT DOCUMENTS

| | | | |
|---|---|---|---|
| 2013/0118131 A1 * | 5/2013 | Weder .................. | B65D 81/022 |
| | | | 53/473 |
| 2019/0261565 A1 * | 8/2019 | Robertson ......... | G06F 18/24323 |
| 2021/0032034 A1 | 2/2021 | Kalouche | |
| 2021/0069910 A1 | 3/2021 | Oleynik | |
| 2021/0387350 A1 | 12/2021 | Oleynik | |
| 2022/0346598 A1 * | 11/2022 | Sinnet .................. | A47J 37/1228 |
| 2023/0294295 A1 | 9/2023 | Creusot et al. | |
| 2023/0398689 A1 | 12/2023 | Brown et al. | |
| 2024/0029020 A1 | 1/2024 | Stork Genannt Wersborg et al. | |
| 2024/0320584 A1 | 9/2024 | Manfrey et al. | |

FOREIGN PATENT DOCUMENTS

| | | | | |
|---|---|---|---|---|
| WO | WO-2022118021 A1 * | 6/2022 | ............. | A01D 46/30 |
| WO | WO-2023000074 A1 * | 1/2023 | ........... | B65B 35/246 |

* cited by examiner

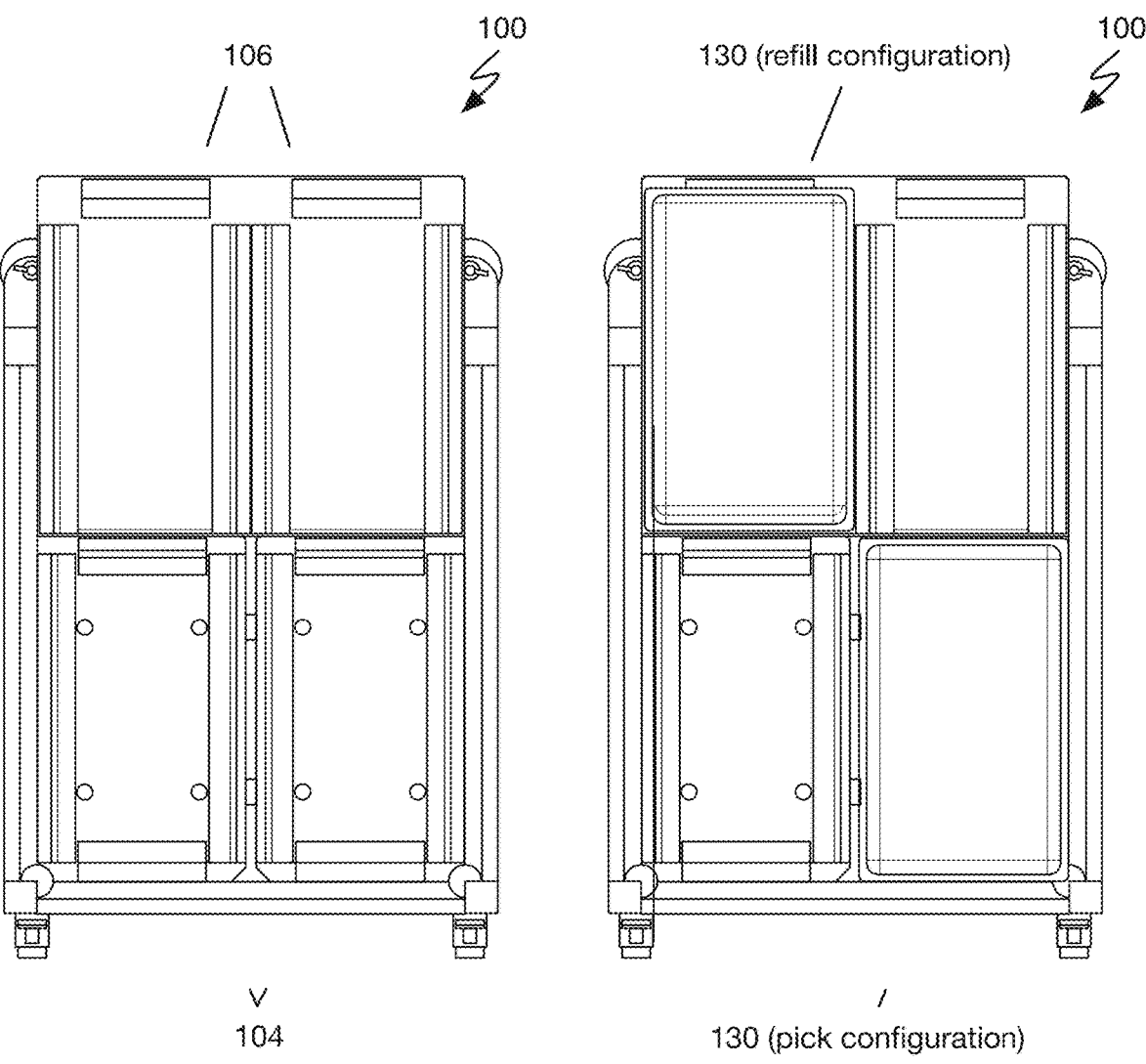
FIGURE 6A                    FIGURE 6B

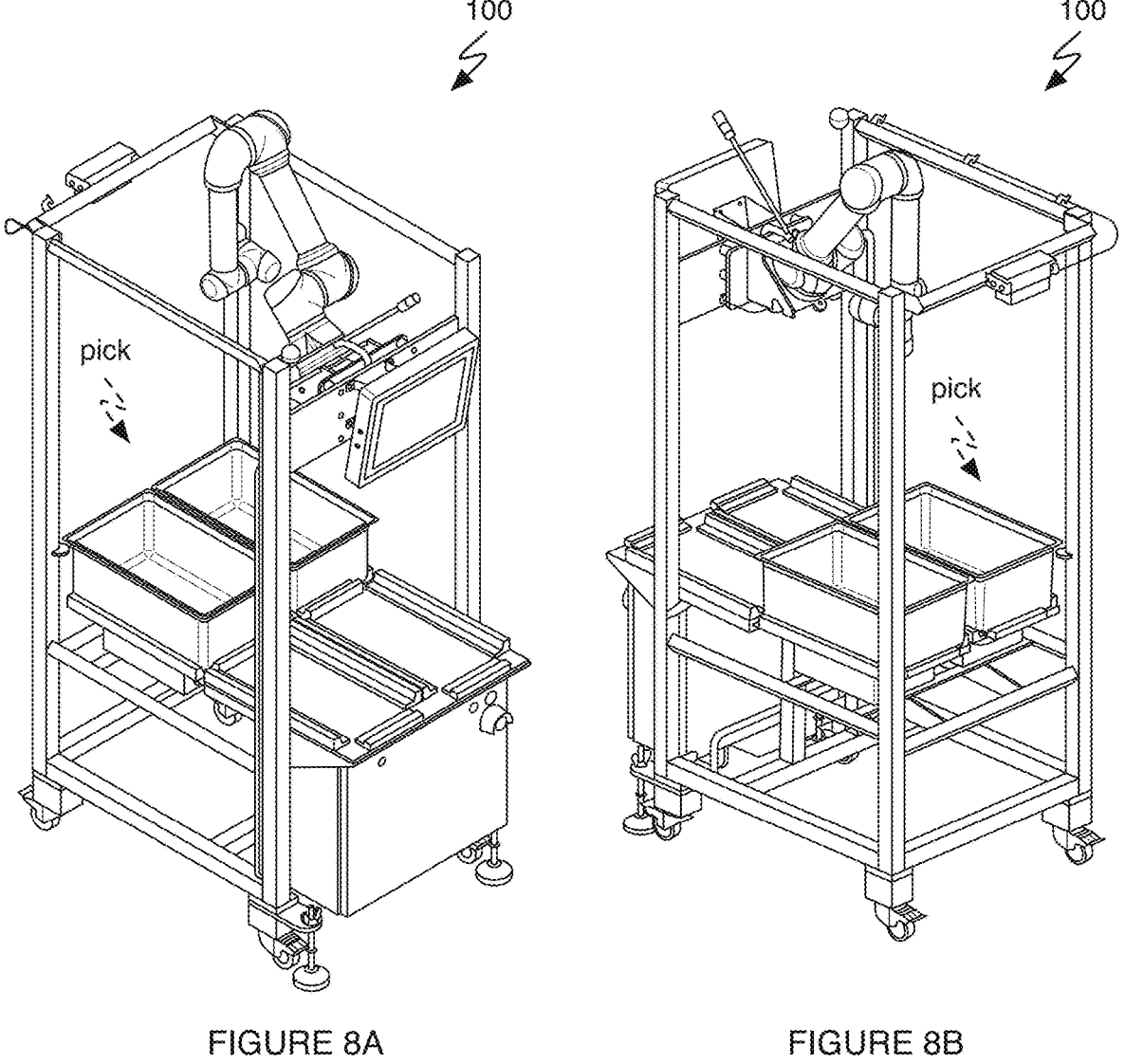
FIGURE 8A                    FIGURE 8B

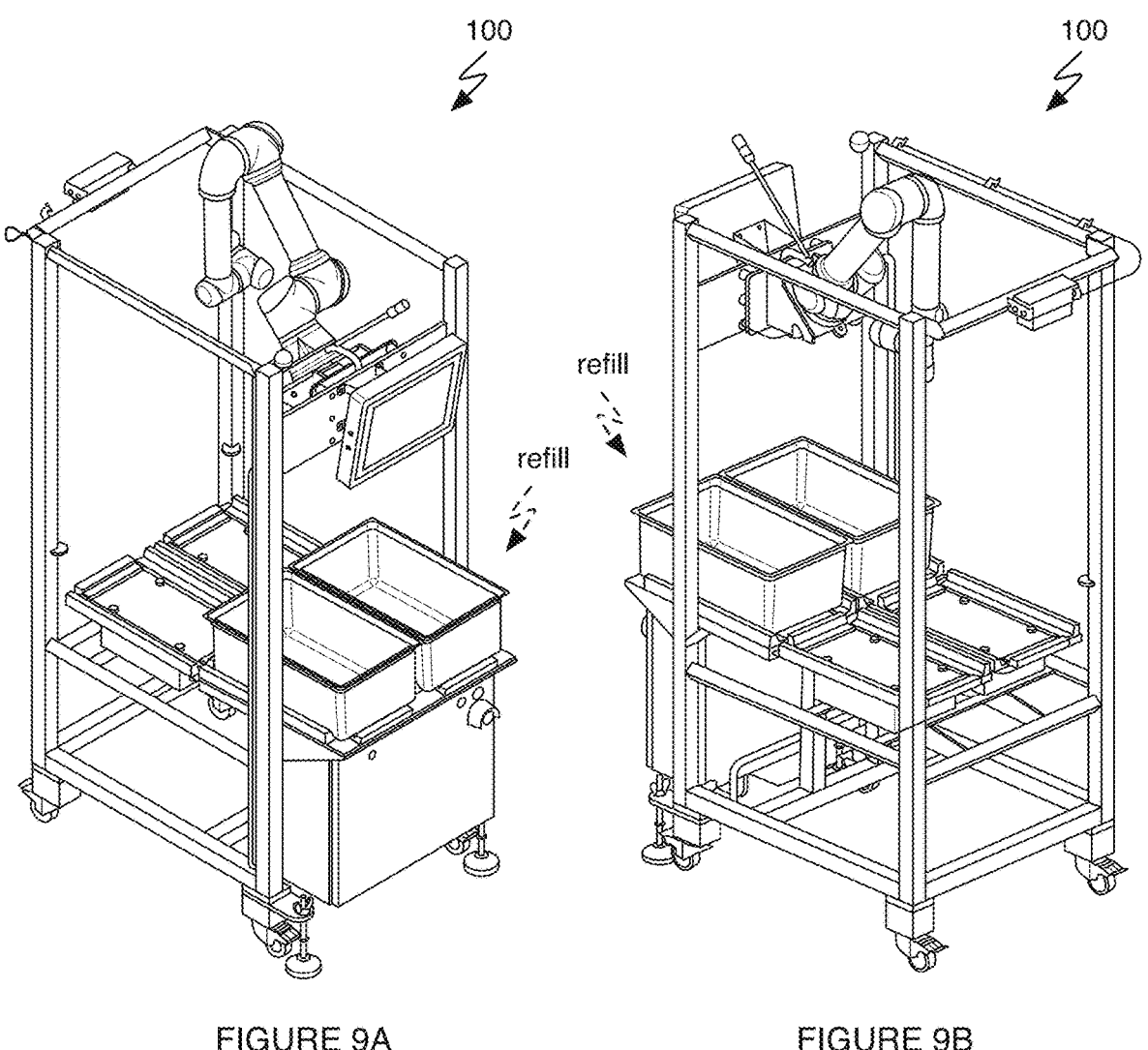
FIGURE 9A                    FIGURE 9B

*All Dimension in millimeters access tool

Removable hygienic
ingredient holder plates

Removable hardware
(e.g., thumb screw)

Removable hygienic
refill table ingredient
holder/guide

120

120

120

100 removable
structures 110 (e.g., refill table)

1

SYSTEM AND/OR METHOD FOR REFILLING ASSEMBLY SYSTEMS

CROSS REFERENCE TO RELATED APPLICATIONS

This application claims the benefit of U.S. Provisional Application Ser. No. 63/335,635, filed 27 Apr. 2022, and U.S. Provisional Application Ser. No. 63/315,647, filed 2 Mar. 2022, each of which is incorporated herein in its entirety by this reference.

TECHNICAL FIELD

This invention relates generally to the robotic assembly field, and more specifically to a new and useful refill system and/or method in the robotic assembly field.

BRIEF DESCRIPTION OF THE FIGURES

FIGS. 6A-6B are 3D section views of a first and second example of a variant of the system, respectively.

FIGS. 8A-8B are opposing isometric views of a variant of the system.

FIGS. 9A-9B are opposing isometric views of a variant of the system.

2

Figures 18A, 18B:
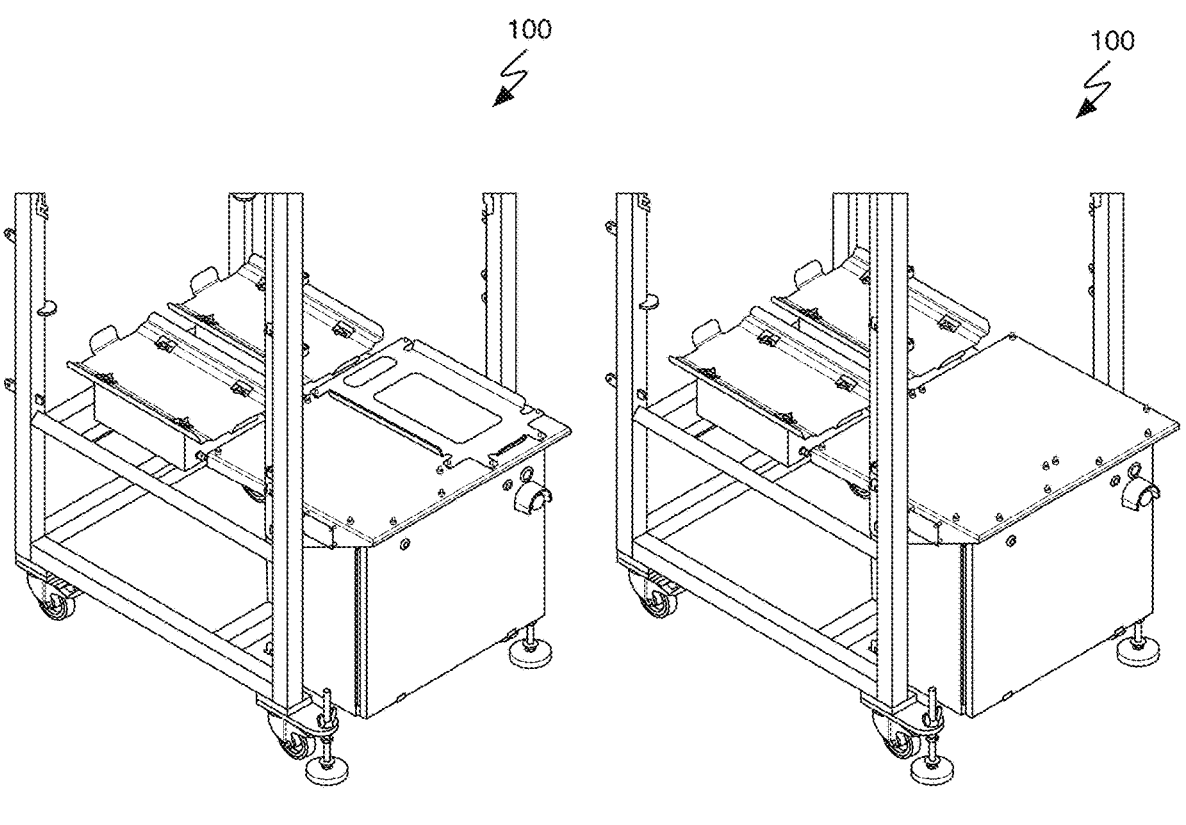

FIGS. 18A-18B are isometric views of a first and second example of a variant of the system, respectively.

Figures 19A, 19B:
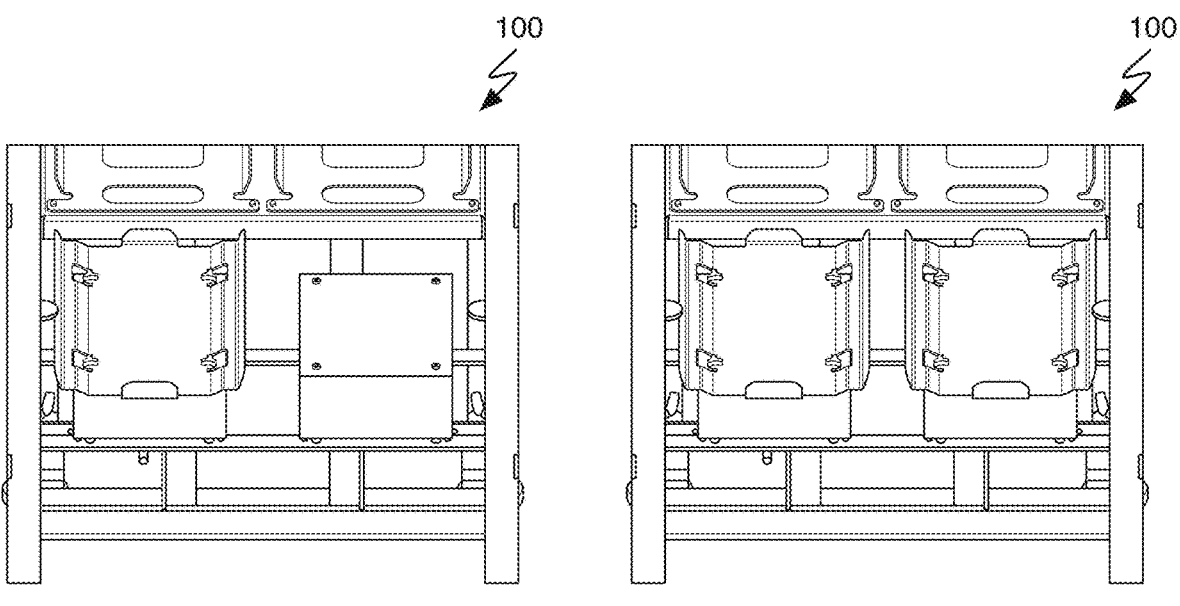

FIGS. 19A-19B are partial diametric views of a first and second example of a variant of the system, respectively.

Figure 20:
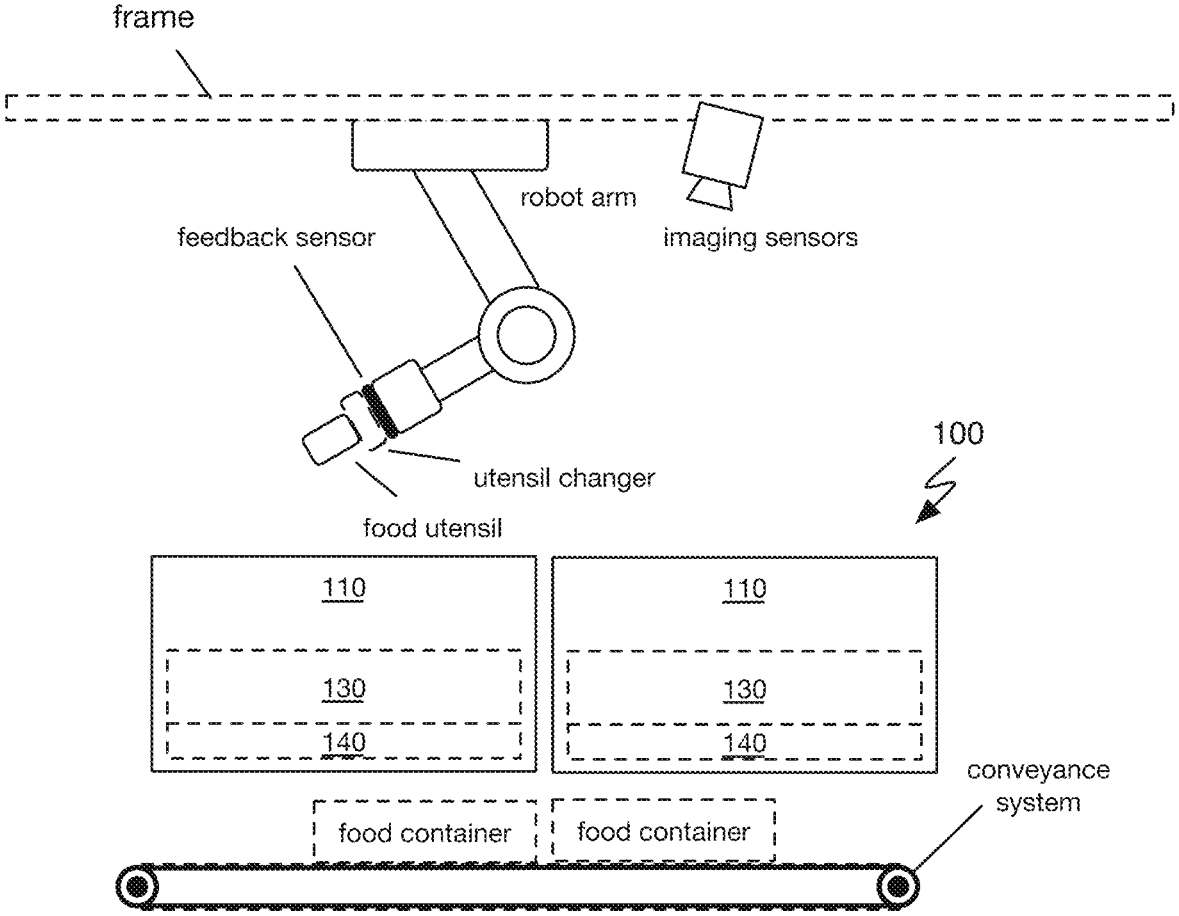

FIG. 20 is a schematic representation of a variant of the system in a conveyor line setting.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
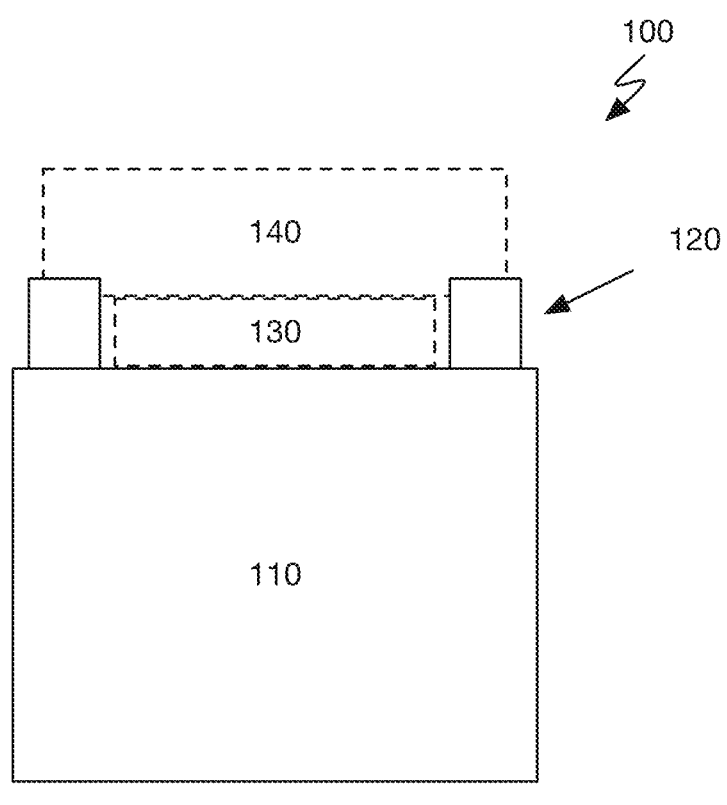
FIG. 1 is a schematic representation of a variant of the system.

The system 100, an example of which is shown in FIG. 1, can include: a base structure 110, a set of support elements 120, and/or any other suitable components. The system 100 can optionally include a foodstuff bin 130 and a force sensor 140. However, the system 100 can additionally or alternatively include any other suitable set of components. The system 100 functions to facilitate refilling of ingredients within foodstuff bins 130 and/or replacement of foodstuff bins 130. Additionally or alternatively, the system 100 can function to facilitate repeatable positioning of foodstuff bins 130 within a workspace of a robotic arm. Additionally or alternatively, the system 100 can function to facilitate rapid calibration, servicing, and/or cleaning of foodstuff assembly modules.

The system 100 can optionally include or be used in conjunction with a robotic assembly system (e.g., an example is shown in FIG. 20), such as a robotic pick and place system, gantry-style assembly system, multi-axis robotic arm, and/or other robotic assembly system. In variants, the system can include or be used in conjunction with the modular system(s) and/or method(s) as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

In variants, the system 100 can optionally include or be used in conjunction with the human machine interface (HMI) and/or refill method(s) as described in U.S. Provisional Application Ser. No. 63/321,999, filed 21 Mar. 2022, which is incorporated herein in its entirety by this reference.

The system 100 can optionally include or be used in conjunction with an industrial conveyor line, or can be deployed in a high-throughput assembly application (e.g., airline food catering prep, etc.), such as to facilitate assembly by human workers and/or cooperative assembly by human operators and robots. However, the system can alternatively be deployed in any suitable assembly settings. In a second set of variants, the system can be implemented in a restaurant setting, such as a 'fast casual', 'ghost kitchen' or low-throughput application (e.g., without continuous operation; universities, K-12, prisons, hotels, hospitals, factories, stadiums, entertainment venues, festivals, etc.).

The term "substantially" as utilized herein can mean: exactly, approximately, within a predetermined threshold or tolerance, and/or can have any other suitable meaning. For instance, the term "substantially parallel" can mean: exactly parallel, approximately parallel, having a surface parallelism of within a threshold tolerance range (e.g., less than 0.1 deg, less than 0.25 deg, less than 1 deg, etc.), having an axis parallelism within a threshold tolerance range (e.g., less than 0.1 deg, less than 0.25 deg, less than 1 deg, etc.), and/or can have any other suitable meaning.

The term "task space" as utilized herein preferably refers to a mathematical set of effector and/or food utensil poses (e.g., available in a particular arrangement), but can be otherwise suitably used or referenced. The term "workspace" preferably refers to a physical volume associated with all reachable/available poses (e.g., points) for the system and/or robot arm thereof. For example, the workspace of a robot arm can be defined entirely based on the geometry of joints and/or intrinsic kinematic constraints of the arm (e.g., a manufacturer specification, etc.). Similarly, the workspace of a foodstuff assembly system which includes a robot arm can be further restricted by constraints imposed by other system components (e.g., frame geometry, joint boundaries imposed by control software, collision constraints, etc.). Accordingly, the restricted workspace of the foodstuff assembly system can refer to the physical volume in which the robot operates based on the (effective) task space of the robot in a particular configuration and/or based on control constraints imposed on the system (e.g., while the robot is directed to pick out of a particular foodstuff bin, for example). However, the term task space, workspace, and/or (effective) operational space can be otherwise suitably utilized or referenced herein.

The term "support elements" as utilized herein can refer to a component which may provide structural support and/or retention to a foodstuff bin in one or more configurations of the foodstuff bin. It is understood that, in variants (e.g., utilizing a removable foodstuff bin), individual support elements may not physically contact, retain, and/or support foodstuff bins in one or more configurations of the system. Likewise, in some variants, the term "support element" may be interchangeably referenced with "retention element" or "element" where suitable. However, these terms may be distinct (e.g., in variants where foodstuff bins are fully supported by a scale or force sensor, where the surrounding elements primarily function to retain and/or align foodstuff bins into a particular configuration) and/or may be otherwise suitably used/referenced.

1.1. ILLUSTRATIVE EXAMPLES

In a first set of variants, a system for facilitating ingredient refilling of a foodstuff bin can include: a base structure and a first set of support elements mounted to the base structure, the first set of support elements including: a set of longitudinal support elements defining a longitudinal axis and a set of lateral support elements which are substantially perpendicular to the longitudinal support axis, wherein the set of longitudinal support elements are substantially parallel to the longitudinal axis with a first subset of longitudinal support elements offset from a second subset of lateral support elements by a foodstuff bin width, wherein the set of lateral support elements includes: a first lateral support element arranged proximal to a first end of the longitudinal support elements and a second lateral support element offset from the first lateral support element along the longitudinal axis by a length of a foodstuff container, wherein the set of longitudinal support elements, the first lateral support element, and the second lateral support element cooperatively define a pick region which is beneath a task space of a robot, wherein the longitudinal support elements defines a refill region opposite the pick region across a thickness of the second lateral support element, wherein a vertical projection of the refill region (and the space vertically above it) lies beyond the task space of the robot. In variants, system can include a force sensor arranged beneath the pick region, the force sensor mounting the first and second lateral support elements to the base (e.g., wherein the force sensor can sample the combined weight of the foodstuff bin and the lateral support elements, be tared with the lateral support elements and an empty bin, etc.). In variants, the system can include a second set of support elements mounted to the base structure and substantially symmetric with the first set of support elements about a midsagittal plane.

In a second set of variants, nonexclusive with the first set, a foodstuff assembly robot includes: a frame; a platform mounted to the frame and defining a set of support regions including: a first and second refill region proximal a first longitudinal end of the frame; a first and second pick region distal to the first longitudinal end of the frame, and longitudinally aligned with the first and second refill regions, respectively; a first foodstuff bin manually slidable between the first refill region and the first pick region along a first path; a second foodstuff bin manually slidable between the second refill region and the second pick region along a second path; a first set of retention structures connected to the platform and configured to at least partially laterally constrain the first foodstuff bins in the first refill region, the first pick region, and all liminal positions along the first path; a second set of retention structures connected to the platform and configured to at least partially laterally constrain the first foodstuff bins in the first refill region, the first pick region, and all liminal positions along the first path; and a robot arm mounted to the frame above the platform and defining a workspace, a vertical projection of the workspace with overlapping the first and second pick regions and nonoverlapping with the first and second refill regions.

2. Benefits.

Variations of the technology can afford several benefits and/or advantages.

First, variations of this technology can increase the safety of human-machine interactions in a robotic assembly context by reducing or eliminating the need for humans to physically enter (or reach into) the workspace or effective operating space of a robotic assembly system while refilling the system with objects and/or ingredients.

Second, variations of this technology can enable facile human-machine interactions in an assembly setting, which can reduce the number of humans required for robotic assembly and/or processing operations. In variants, the system can minimize lifting requirements for system servicing and/or ingredient refilling, such as by reducing the number or duration of two-handed lifts and/or lifts above a weight threshold (e.g., 10 lbs.; 25 lbs.; etc.) which are performed by a line worker. As an example, a foodstuff bin can be transitioned between a pick region and a refill region (and vice versa) by lifting one end of the bin over a (lateral) support element and sliding the bin longitudinally (between longitudinal support elements) until it nests into place between a pair lateral support elements. The support and/or retention provided by the support elements may convert an awkward and/or heavy two-handed lift into a one-handed task (e.g., which may be performed within threshold range of a standard work surface height, where less than 20 pounds of force may be applied, etc.), which can be less burdensome to perform rapidly and/or repetitively.

Figures 7A, 7B:
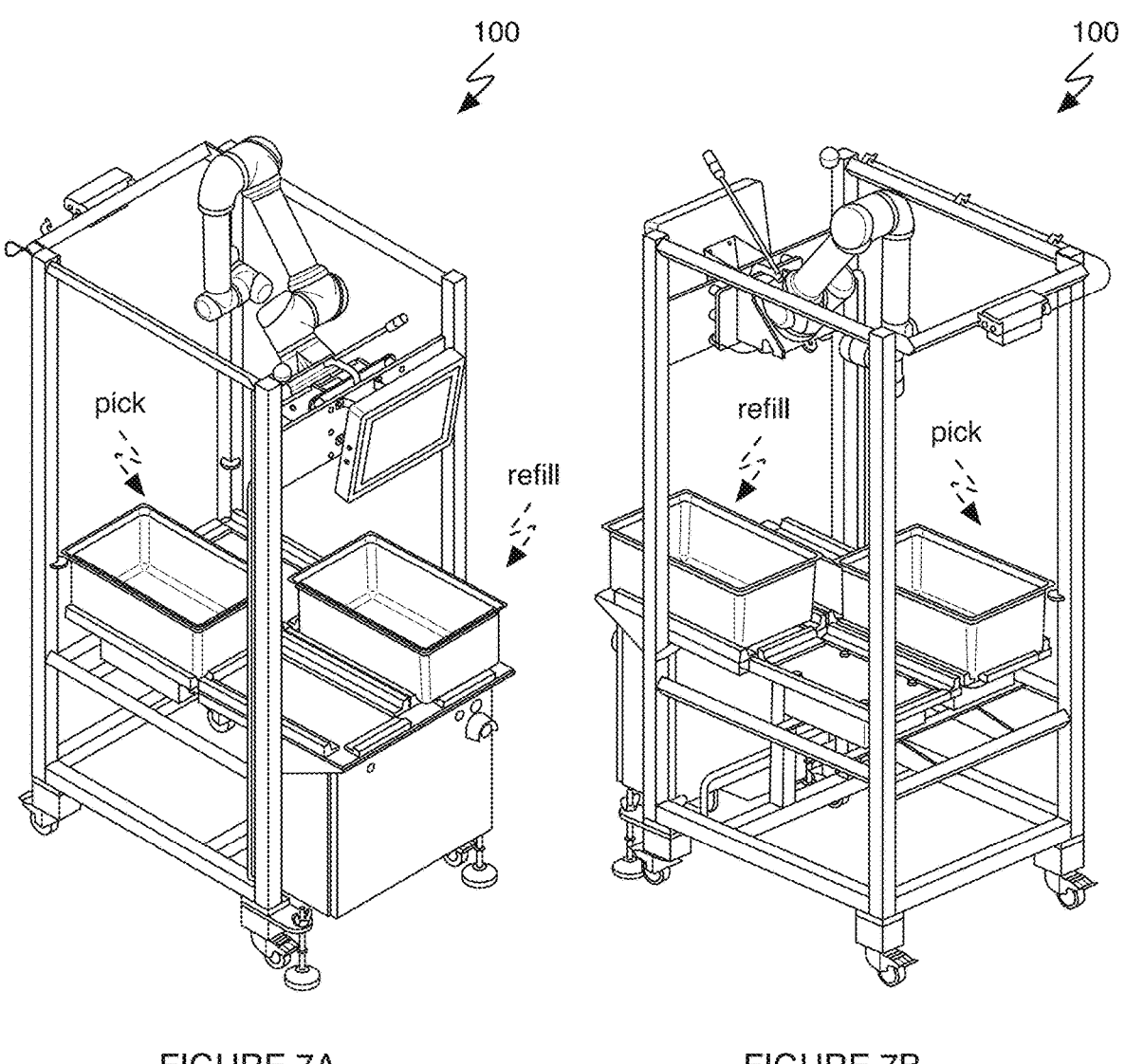
FIGS. 7A-7B are opposing isometric views of a variant of the system.

Third, variations of this technology can facilitate substantially continuous operation of a robotic assembly system while an operator is refilling ingredients by utilizing redundant/duplicative containers (e.g., foodstuff bins) housing the same set of ingredients. For instance, while one foodstuff bin is being refilled, a robotic system may continue to operate while picking from a second foodstuff bin (an example of such a configuration is shown in FIGS. 7A-B). Facilitating refill during operation of a robotic assembly system can minimize downtime of the robotic assembly system, which can be particularly advantageous in high-throughput applications, such as when the system is deployed along a conveyor line.

Fourth, variations of this technology can facilitate food safe operations, cleaning, and/or servicing of a robotic assembly system in a food assembly context. In particular, the system can allow facile user interactions with a system without fluid lubricants or extraneous movable components (e.g., drawer slides, linear rail slides, etc.), which may dramatically increase the difficulty of system cleaning (e.g., by wipe down or wash-down). Additionally, the system can allow foodstuff bins (and/or support elements/structures) to be removed and cleaned without disassembly of the system, which can enable dishwashing and/or remote cleaning (e.g., in a clean out of place [COP] solution).

Fifth, variations of this technology can facilitate consistent bulk object/ingredient assembly (e.g., when compared to a human or a dispensing system) by providing automatic feedback sensing of ingredient weights and/or pick amounts. Such variants can ensure high accuracy (e.g., mass/volume/quantity within a threshold tolerance, such as within 10% of a predetermined amount), auditability (e.g., pick amounts can be automatically validated/verified), and/or repeatability of assembled food amounts, which may provide cost savings and/or reduce the requirements for downstream verification of ingredient amounts (e.g., for quality control metrics, etc.).

However, variations of the technology can additionally or alternately provide any other suitable benefits and/or advantages.

3. System.

The system 100, an example of which is shown in FIG. 1, can include: a base structure 110, a set of support elements 120, and/or any other suitable components. The system 100 can optionally include a foodstuff bin 130 and a force sensor 140. However, the system 100 can additionally or alternatively include any other suitable set of components. The system 100 functions to facilitate refilling of ingredients within foodstuff bins 130 and/or replacement of foodstuff bins 130. Additionally or alternatively, the system 100 can function to facilitate repeatable positioning of foodstuff bins 130 within a workspace of a robotic arm. Additionally or alternatively, the system 100 can function to facilitate rapid calibration, servicing, and/or cleaning of foodstuff assembly modules.

The system 100 and/or exposed external components thereof are preferably configured to operate in a food production/assembly environment, and can be: constructed from food safe materials (e.g., stainless steel, food safe Delrin®, food safe titanium, food safe coatings, etc.), configured for wash down operations (e.g., ingress protected, such as in compliance with IP67, IP67+, IP69, etc.), and/or otherwise configured to operate in a food production/assembly environment. Additionally or alternatively, components which are configured to contact foodstuffs during nominal operation (e.g., during each operational cycle; food utensils and foodstuff bins; etc.) can be removable and/or interchangeable (e.g., for remote cleaning; dishwasher cleanable and/or cleanable with a clean out of place [COP] solution, etc.).

The system 100 can optionally include or can be used with a set of foodstuff bins 130 which functions to retain ingredients for assembly (e.g., to fill an order or a predetermined configuration). Foodstuff bins can include hotel pans, food trays, NSF food safe containers, and/or other suitable containers. There can be a single foodstuff bin (e.g., single hotel pan) or multiple foodstuff bins (e.g., in an array or grid). Foodstuff bins can be identical or vary in size/shape according to the corresponding ingredient housed therein. The foodstuff bins are preferably removable and/or interchangeable (e.g., for cleaning and/or ingredient servicing; based on the arrangement of support structures), but can be otherwise configured.

In some variants, foodstuff bins can be stackable and/or can have a wall(s) with a positive draft angle (e.g., relative to a base of the foodstuff bin), but can alternatively have no draft angle or be otherwise formed. In some variants, the foodstuff bin can have rounded, arcuate, and/or filleted edges (e.g., proximal to a base), but can be otherwise formed. In some variants, foodstuff bins can include a handle, protruding lip, peripheral flange, and/or other graspable feature disposed near an upper end of the foodstuff bin which extending outward relative to the interior cavity of the foodstuff bin (e.g., along a long axis of the foodstuff bin).

The system 100 is preferably configured to simultaneously support at least two foodstuff bins (e.g., in the same/different configurations) which may allow one to foodstuff bin to be refilled while the robot picks from the remaining foodstuff bin, thereby facilitating substantially continuous operation (e.g., without requiring a pause to refill an empty bin) and/or robot picks contemporaneously occurring during refills. As an example, the foodstuff assembly module can be configured to pick (e.g., with a collaborative robot arm) foodstuff ingredients from a first foodstuff bin of the plurality contemporaneously with an operator manually transitioning a second foodstuff bin of the plurality between the pick region and the refill region. However, the system can be configured to operate with a single foodstuff bin, a plurality of foodstuff bins (e.g., exactly two, more than two, etc.), and/or any other suitable number of foodstuff bins.

However, the system can include any other suitable set of foodstuff bins. Alternatively, the system can altogether exclude foodstuff bins (e.g., in one or more configurations, such as during cleaning) and/or can be otherwise suitably configured.

3.1 ROBOTIC ASSEMBLY MODULE

In variants, the system 100 can optionally include, operate in conjunction with, and/or integrate with a robotic assembly module which includes a robot arm and a frame. The robot arm functions to pick foodstuff within the foodstuff bin(s). The robot arm can additionally or alternatively function to place food within food containers (e.g., bowls, microwave trays, etc.). The robot arm is preferably a collaborative robot arm, but can additionally or alternatively be an industrial robot arm and/or any other suitable robot arm. Alternatively, variants can interchangeably utilize any other suitable robotic actuation system(s) such as a gantry system (e.g., belt actuated, ball and screw, linear tubular motor, etc.), delta robot (or delta robot arm), and/or any other suitable robot, robot arm, or robotic system. The robot arm can include any suitable number of joints which enable articulation of the utensil (or another end effector) in a single degree of freedom (DOF). The arm preferably includes 6 joints (e.g., a 6-axis robot arm), but can additionally or alternatively include three joints, seven joints, more than seven joints, and/or any other suitable number of joints. In some variants, the robot arm may be dimensionally oversized and/or over-articulated relative to the effective task space, which may facilitate higher speed actuation, more favorable kinematics, and/or greater control versatility in different contexts.

The robot arm is preferably mounted to the frame above a top plane of the support elements and/or above the foodstuff bin, which can enable the arm to be return to a pose which is offset from the food containers and/or foodstuff bin (i.e., allowing a user to access foodstuff and/or foodstuff bins with minimal restriction). More preferably, a base joint of robot arm is mounted to an upper portion of the frame and angled towards the foodstuff bin (e.g., directed vertically downward; joint axis defines an angle of 30 degrees, 45 degrees, 60 degrees, 90 degrees, and/or any subrange bounded therein relative to a gravity vector; relative to horizontal; etc.). In a specific example, the robot arm can be mounted with a surface normal vector of the base of the robot arm defining a zenith angle between zero degrees (e.g., surface normal directed vertically upward; robot arm directed vertically downward) and 150 degrees (e.g., robot arm inclined by 30 degrees). In a second specific example, the robot arm can be mounted on an incline, angled towards the food container and/or conveyor region (e.g., such at an angle of about 45 degrees). However, the robot arm can be top-mounted, wall-mounted/side-mounted and/or bottom-mounted/floor-mounted (e.g., with a base joint directed upwards). However, the robot arm can be otherwise suitably mounted.

In variants, the robot arm can be mounted to the frame: on the same side as a conveyor and/or adjacent to a conveyor region (e.g., adjacent a portion of the robotic system proximal to the conveyor); opposite a conveyor and/or a conveyor region; symmetrically or asymmetrically about a midsagittal plane; and/or with any other suitably arrangement. In a specific example, the robot arm can be mounted opposite a human machine interface (e.g., on a rear portion of the robotic assembly system, distal the conveyor) and refill region.

The robot arm, including elements and/or joints thereof, can be surrounded by the frame (e.g., within a bounding box of the frame; within a guarded perimeter of the frame; bounded in a horizontal plane by a set of guards or physical user protections; within an open-sided frame; etc.) in one or more configurations (e.g., power-off state). Additionally or alternatively, the robot arm and/or one or more joints/elements thereof can be configured to articulate above the frame and/or extend through the frame (e.g., through a top end of the frame, through an aperture/orifice at the top of the frame, etc.). In a specific example, the robot arm comprises a plurality of joints, wherein at least one joint of the robot arm extends above a top plane of the frame in one or more configurations.

In variants, the system 100 can include or be used in conjunction with the foodstuff assembly system as described in U.S. application Ser. No. 17/881,475, titled "SYSTEM AND/OR METHOD FOR ROBOTIC FOODSTUFF ASSEMBLY," filed 4 Aug. 2022, which is incorporated herein in its entirety by this reference.

However, the system can include any other suitable robot arm and/or robotic actuation system(s).

The frame functions to structurally support the robot arm. The frame can additionally function to position the foodstuff bin relative to the robot arm. The frame can additionally or alternatively function as a food assembly workstation for a human (e.g., kitchen and/or line worker; where the base structure is integrated into the frame). The frame can define an open, partially enclosed, or fully enclosed workspace of the system. The size of the frame can be sized to conform to the physical constraints of a kitchen or industry line environment, such as defining: a width less than a predetermined threshold dimension (e.g., width of standard doorway, width of a standard worksurface; 24 inches, 36 inches, greater than 36 inches, etc.), width greater than and/or defined based on a foodstuff bin width (e.g., combined width of the foodstuff bins with clearance for removal in one or more predetermined directions; about twice the width of a standard hotel pan, etc.), area less than a predetermined threshold area (e.g., half of a standard worksurface table area, 24 inches×36 inches, etc.), and/or a height within a predetermined threshold (e.g., foodstuff bin height within a range of standard worksurface heights; full height less than doorframe height, etc.). In variants, the frame width can be: less than 18 inches, 18 inches, 20 inches, 24 inches, 26 inches, 28 inches, 30 inches, 32 inches, 36 inches, greater than 36 inches, any open or closed range bounded by the aforementioned values, and/or any other suitable width. In a specific example, the frame can be about 30 inches wide by about 76 inches tall.

The frame can be self-supporting (e.g., free-standing), rigidly mounted (e.g., fixed to the floor), suspended (e.g., to a superstructure, such as a roof), wall mounted, and/or otherwise configured. The frame can be unitary or modular. In variants, multiple modules of the foodstuff assembly system can be rigidly connected and/or aligned to one another with various mounting hardware, alignment features, and/or spanning members. Alternatively, the system can be mechanically isolated and/or physically separate from other modules (e.g., in an industrial line setting), and/or can be otherwise suitably configured.

The frame is preferably constructed of a food safe material (e.g., a stainless steel weldment; wipe-down/washdown material) and/or includes a food safe coating or other suitable protective coating (e.g., food safe powder coat, food safe anodized coating, unfinished stainless steel, etc.). In a specific example, the frame can be constructed from T-slot (e.g., 80/20) or other reconfigurable framing materials. In variants where the frame is free-standing, the frame can include any suitable stiffening and/or damping elements to mitigate vibrations resulting during actuation of the robot arm. However, the frame can be otherwise constructed.

The frame can be static, movable (e.g., wheeled, having a set of casters, etc.), adjustable (e.g., height adjustable, attitude adjustable, etc.), leveled (e.g., via leveling feet, such as rubberized mounting feet), and/or can be otherwise configured. In a first set of variants, the frame can be attitude adjustable, which may facilitate stability on non-horizontal ground surfaces (e.g., to facilitate water drainage, etc.) and/or accommodation of various conveyor configurations in a line settings. For example, a height and/or attitude of the frame structure and/or one or more elements thereof may be (manually) adjustable/variable to conform to floors and/or conveyors which are curved and/or angled (e.g., in pitch and/or yaw).

In some variants, superior surfaces the frame and/or members/elements thereof may be curved and/or angled to a horizontal (gravity-relative) plane, which may facilitate water drainage (e.g., during wash-down) and/or reduce aggregation of liquid/solids on superior surfaces of the system. Additionally or alternatively, support surfaces of the frame (e.g., configured to support foodstuff bins) may be offset from frame structures and/or arranged on standoffs (e.g., offset by at least a predetermined clearance, such as a hand/finger clearance; to facilitate wipe-down and/or wash-down operations). As an example, the frame can include standoffs between each pair of adjacent wash-down parts (e.g., stainless steel members of the frame and/or support structure), which may allow for washing, hosing, and/or manual cleaning between them.

However, the system can include any other suitable frame.

3.2 REFILL TABLE

The base structure 110 (a.k.a., refill table) functions to structurally mount and/or support the set of support elements 120 and the foodstuff bins 130 (in one or more configurations of the system). The base structure can be self-supporting (e.g., free-standing), rigidly mounted (e.g., fixed to the floor), suspended (e.g., to a superstructure, such as a roof), wall mounted, integrated into the frame of a foodstuff assembly module, and/or otherwise configured. The base structure can be unitary (e.g., for an individual robotic assembly system and/or a predefined array of foodstuff bins) or modular (e.g., one base structure per foodstuff bin and/or pick region, etc.). In variants, multiple modular base structures can be rigidly connected and/or aligned to one another with various mounting hardware. Alternatively, the base structures can be mechanically isolated and/or physically separate from other modules and/or from an assembly frame, and/or can be otherwise suitably configured.

The base structure is preferably constructed of a food safe material (e.g., a stainless-steel weldment; wipe-down/washdown material) and/or includes a food safe coating or other suitable protective coating (e.g., food safe powder coat, food safe anodized coating, unfinished stainless steel, etc.). In a specific example, the base structure can be constructed from T-slot (e.g., 80/20) or other reconfigurable framing materials. In variants where the frame is free-standing, the frame can include any suitable stiffening and/or damping elements to mitigate vibrations resulting during ingredient picking and/or ingredient refilling (e.g., a shock/impulse resulting from a foodstuff bin being shifted into place and/or one end of a foodstuff bin falling down a step in a retention feature). However, the base structure can be otherwise constructed. The base structure can be static, movable (e.g., via a set of casters), leveled (e.g., via leveling feet, such as rubberized mounting feet), and/or can be otherwise arranged.

However, the system can include any other suitable base structure.

The set of support elements 120 functions to structurally support and/or retain the foodstuff bins. Additionally or alternatively, the set of support elements can function to facilitate repeatable positioning of foodstuff bins within a workspace of the robotic arm. Additionally or alternatively, the set of support elements can facilitate alignment of the foodstuff bins during manual transitions between configurations. Additionally or alternatively, the set of support elements can cooperatively define a plurality of foodstuff bin configurations.

Figures 10A, 10B:
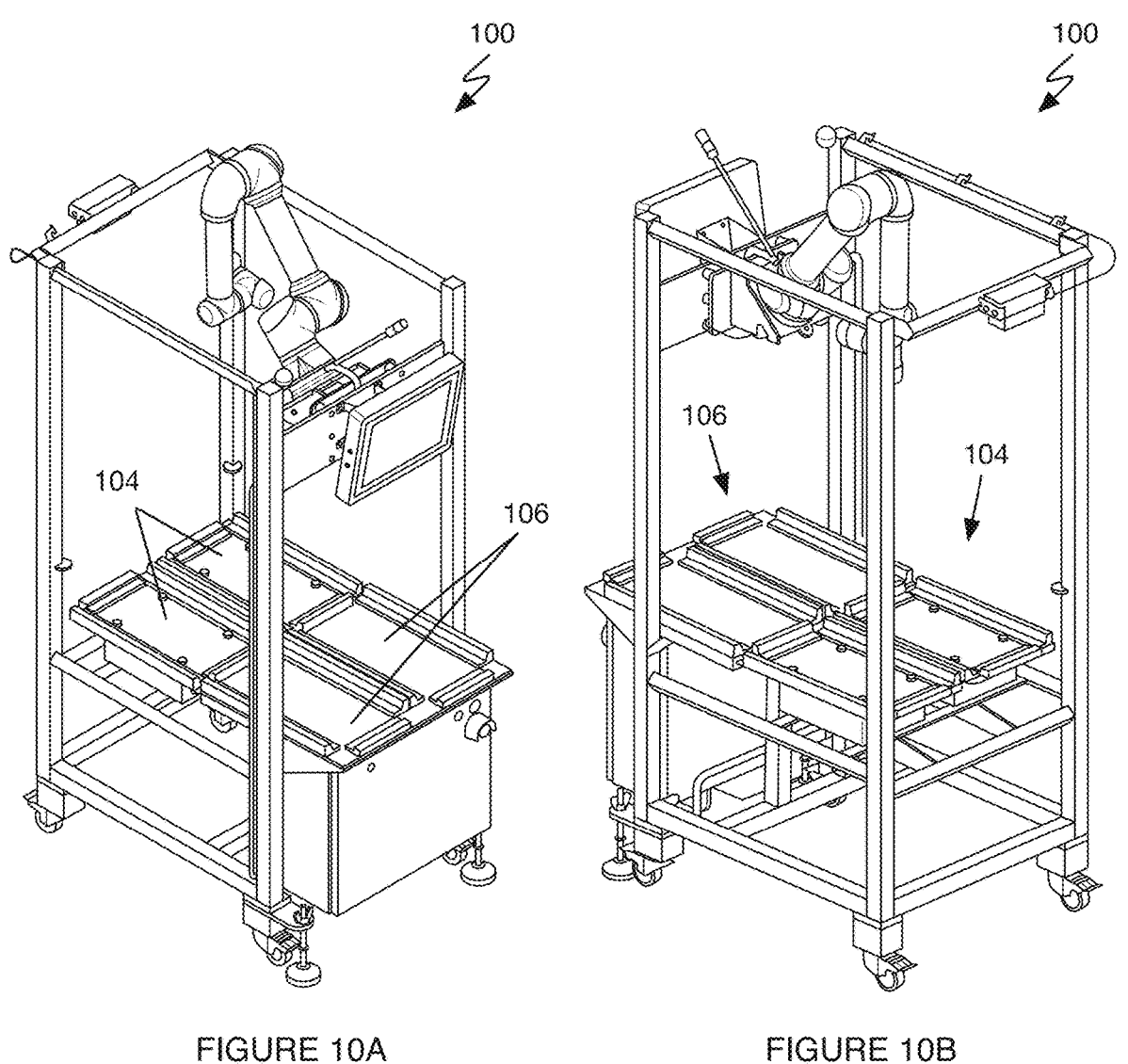
FIGS. 10A-10B are opposing isometric views of a variant of the system.
Figures 10C, 10D:
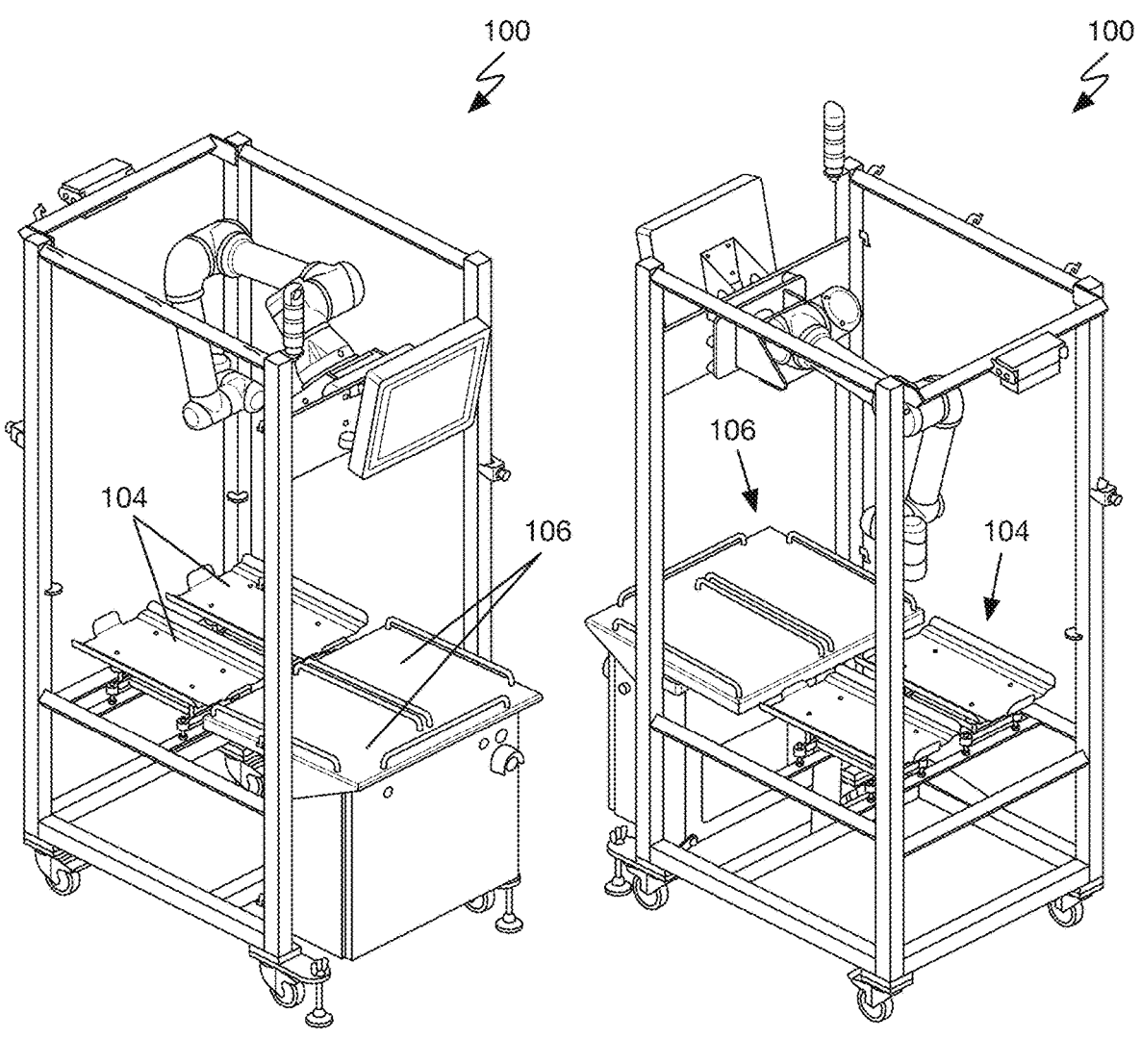
FIGS. 10C-10D are opposing isometric views of a variant of the system.
Figure 11A:
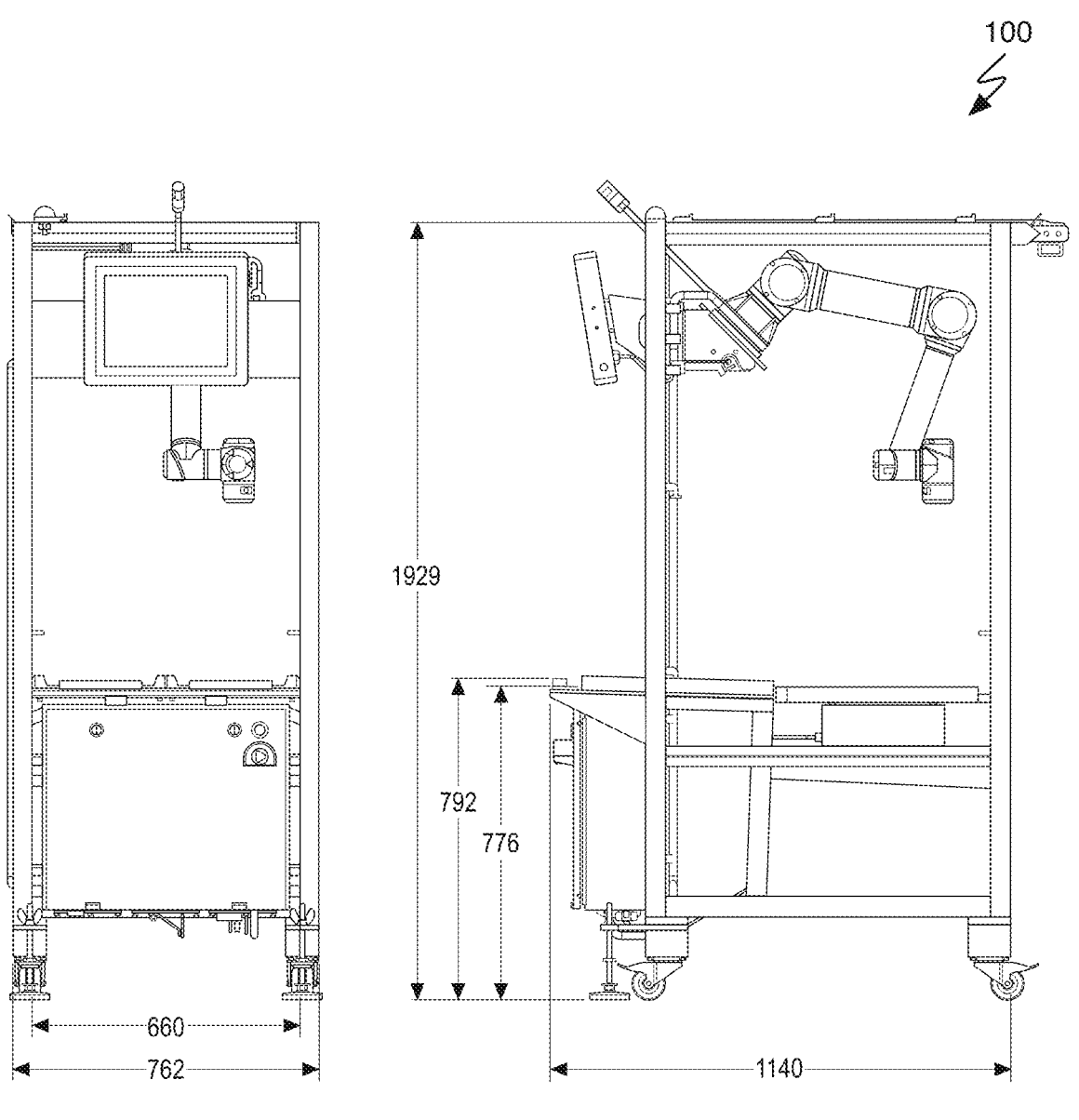
FIG. 11A is a schematic illustration of a variant of the system with example dimensions.
Figure 11B:
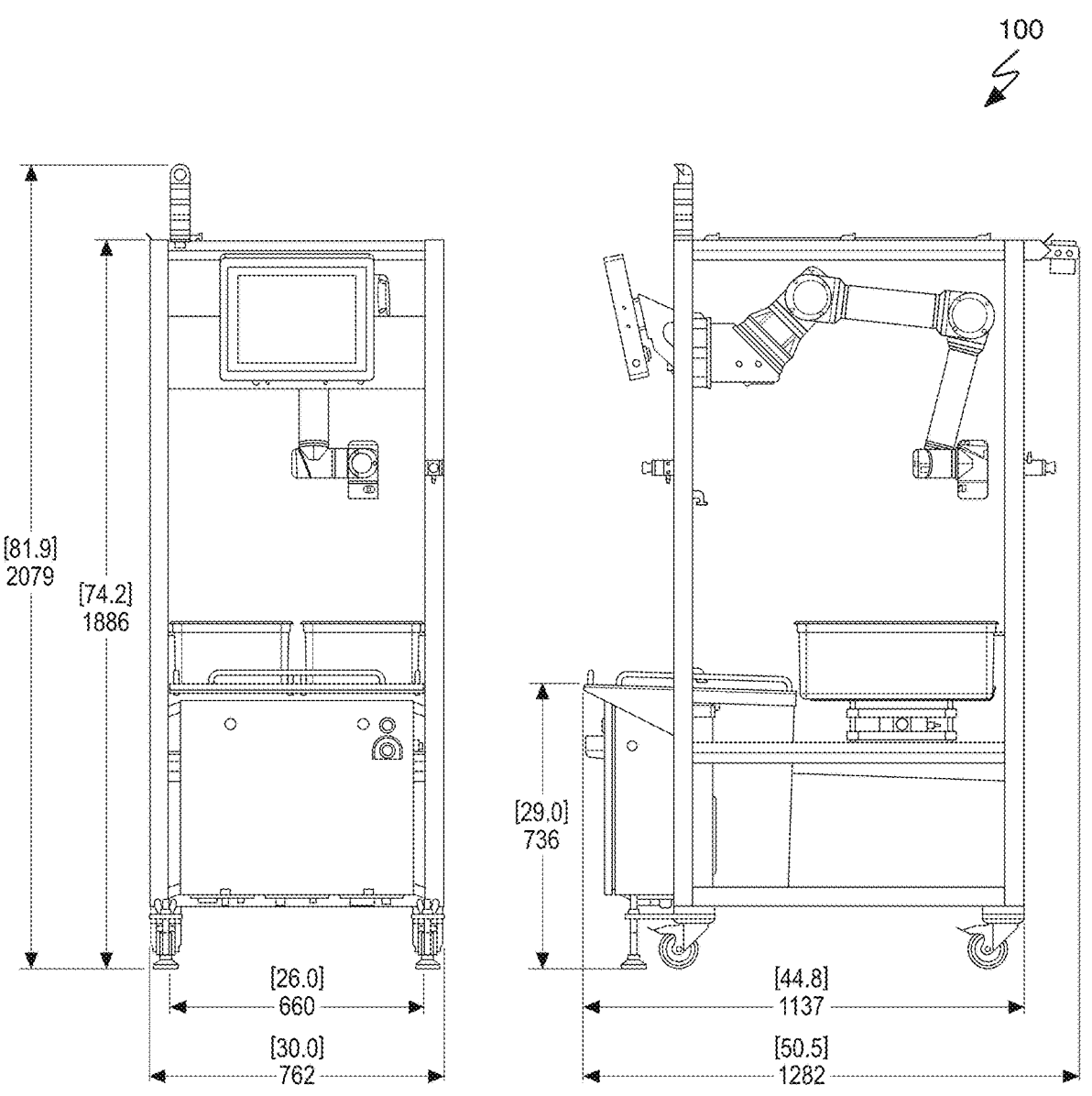
FIG. 11B is a schematic illustration of a variant of the system with example dimensions.

Support elements can be mounted to, supported by, and/or integrated with the base structure (a.k.a. refill table), such as via mechanical fasteners (e.g., screws fasteners, turn clamp fasteners, etc.), bonding agents, adhesives, and/or any other suitable attachment(s). In some variants, an interior surface of each support element can be mounted flush against a superior surface of the base structure (e.g., without introducing a gap, which can minimize foodstuff aggregation and/or cleaning surfaces). In some variants, support elements can be mounted offset from a superior surface of the base structure (e.g., using standoffs; introducing a gap between 10 mm and 50 mm; etc.), which may allow cleaning access, hand access, and/or (cleaning) tool access to an inferior surface of the support elements and/or a superior surface of the base structure beneath the support element(s). As an example, support structures can include or be mounted to a platform/body with a substantially planar superior surface, wherein the corresponding retention elements are offset from the superior surface by between 10 millimeters and 50 millimeters along a majority of their length (e.g., dowel rods/rails; an example is shown in FIGS. 10C and 10D; a second example is shown in FIG. 11B; a third example is shown in FIG. 13B).

Support elements 120 can be mounted directly to a base structure (e.g., collectively, individually, etc.), indirectly mounted to the base structure (e.g., mounted to a weight measurement surface of a scale, etc.), integrated with a body of the base structure, and/or otherwise mounted/assembled. Support elements are preferably constructed of food safe polymers, rubbers, and/or thermoplastics, but can additionally or alternatively be constructed with metals (e.g., same material[s] as the base structure; aluminum, stainless steel, copper, etc.). More preferably, support elements are constructed from a self-lubricating material, such as polyoxymethylene (POM), such as Delrin® material by DuPont™, or polytetrafluoroethylene (PTFE), which may reduce the friction during transition between bin configurations and/or improve the lifetime and wear characteristics of the system over many cycles. Additionally or alternatively, the support elements preferably have a greater damping coefficient than the material of the base structure, which can reduce or mitigate the resulting shock vibrations on the system from manual transitions and/or ingredient refilling. For example, support elements having a low damping coefficient (e.g., less than that of the base structure) might otherwise propagate undesirable perturbations from refilling to other parts of the system (e.g., a robot arm) which may, in some circumstances, reduce the accuracy or consistency of assembly operations of a robotic assembly system operating during refill (e.g., particularly if the base structure is mechanically coupled to a base of the robotic assembly system).

The support elements 120 are preferably shaped with a uniform extruded cross-section, such as a rectangular prism, semi-cylinder, cylindrical (e.g., cylindrical rails, tubes/rods, etc.), extruded angle (e.g., L shape, inverted T-shape, etc.), bent sheet metal (e.g., into one of the aforementioned profiles; examples are shown in FIGS. 13-17, 18A-B, and 19A-B), or other geometry, but can be otherwise formed. More preferably, a superior surface of the support elements is shaped to substantially nest with the profile of a lower edge of a foodstuff bin along an engagement portion of the superior surface. For example, the engagement portion of the support element cross section be concave, substantially matching the outer curvature of a fillet of a foodstuff bin. Alternatively, the support elements can be arcuate (e.g., with a different profile than the lower edge of the foodstuff bin), can be planar (e.g., with a draft angle at least as large as a draft angle of the foodstuff bins), engage only the sidewalls of a foodstuff bin, can or can be otherwise configured. The engagement portion of the support elements can have a draft angle which is the same or different from a draft angle of the side walls of the foodstuff bin. For example, the engagement portion of the support elements can have a larger draft angle than the foodstuff bins (e.g., which may facilitate the foodstuff passively 'self-centering' towards a calibrated center position when transitioned between configurations).

In variants, the set of support elements can include a set of longitudinal support elements 112, which are configured to engage a longitudinal base edge of at least one foodstuff bin at an engagement portion of the superior surface (e.g., along a long axis of the foodstuff bin, proximal the base of the foodstuff bin) and a set of lateral support elements 114, which are configured to engage a lateral edge of at least one foodstuff bin at an engagement portion of the superior surface (e.g., perpendicular to the long axis of the foodstuff bin; which are arranged perpendicular to the longitudinal support elements).

Pairs of adjacent lateral support elements (and/or engagement surfaces thereof) are preferably offset by a base length of the foodstuff bins and longitudinally aligned, which can constrain longitudinal translations of the foodstuff bin (e.g., along a longitudinal axis) when it is positioned in the region between them. Likewise, pairs of adjacent longitudinal support elements (and/or engagement surfaces thereof) are preferably offset by a base width of the foodstuff bins, which can constrain lateral translations of the foodstuff bin (e.g., perpendicular to a longitudinal axis) when it is positioned in the region between them. It is understood that, in some variants, portions of support elements can be removed or eliminated while still achieving the same foodstuff bin constraints. For example, removal of a central section of a lateral support element can achieve a substantially similar alignment and retention of a foodstuff bin. Similarly, lateral and longitudinal support elements can be collectively mounted, individually mounted, integrated into a single assembly, formed as a unitary body(ies), and/or otherwise suitably integrated into the system.

Lateral support elements 114 and longitudinal support elements 112 (e.g., which can simultaneously engage a longitudinal and a lateral edge of a foodstuff bin, respectively) can cooperatively define a corresponding region which can support a foodstuff bin in a corresponding foodstuff bin configuration (e.g., examples of regions and corresponding bin configurations are shown in FIGS. 6A-B). Alternatively, support regions can be defined as existing between: a pair of lateral support elements and/or a pair of longitudinal support elements, any support surface which can support a base periphery of a foodstuff bin, and/or regions can be otherwise suitably defined. The set of support elements is arranged to define a pick region 104 (and corresponding bin configuration) and a refill region 106 (and corresponding bin configuration) for each foodstuff bin housed by the system. The set of support elements can be configured to house exactly one foodstuff bin (e.g., an example is shown in FIG. 2A), multiple foodstuff bins (e.g., an example is shown in FIG. 2B), and/or any other suitable set of foodstuff bins.

Figure 2:
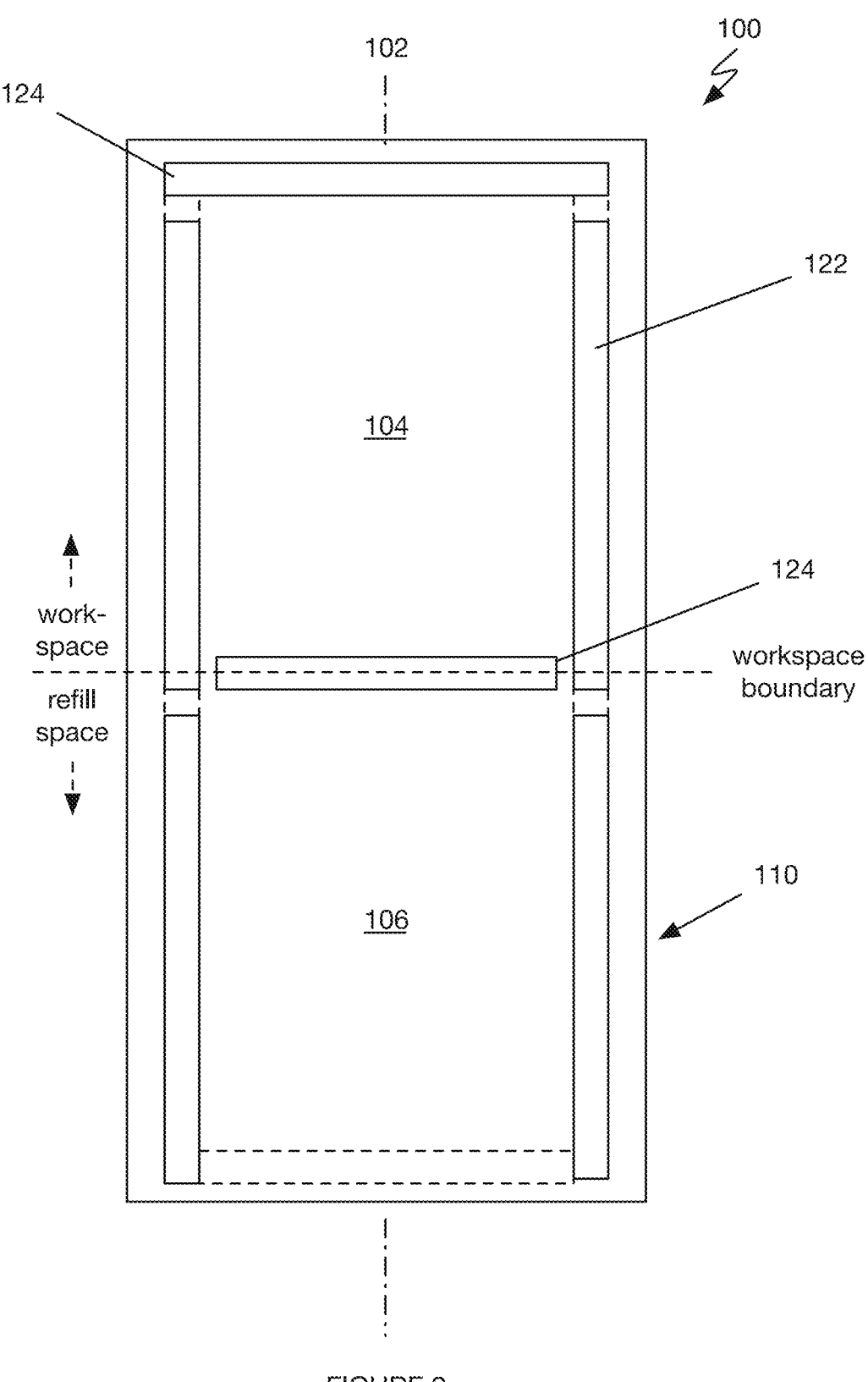
FIG. 2 is a schematic representation of a variant of the system.
Figures 3A, 3B:
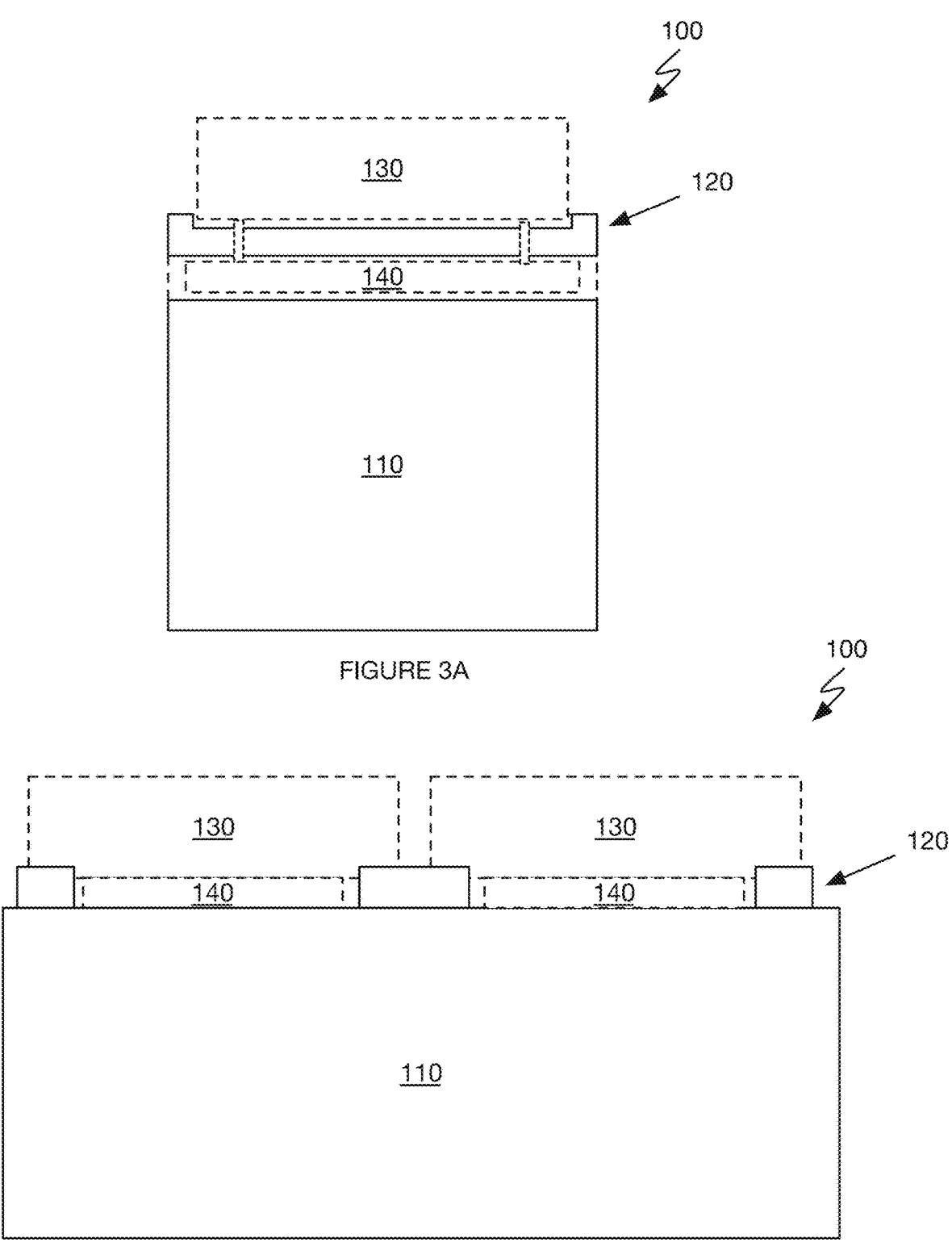
FIGS. 3A-3C are front view schematic representations of a first, second, and third variant of the system, respectively.
Figure 3C:
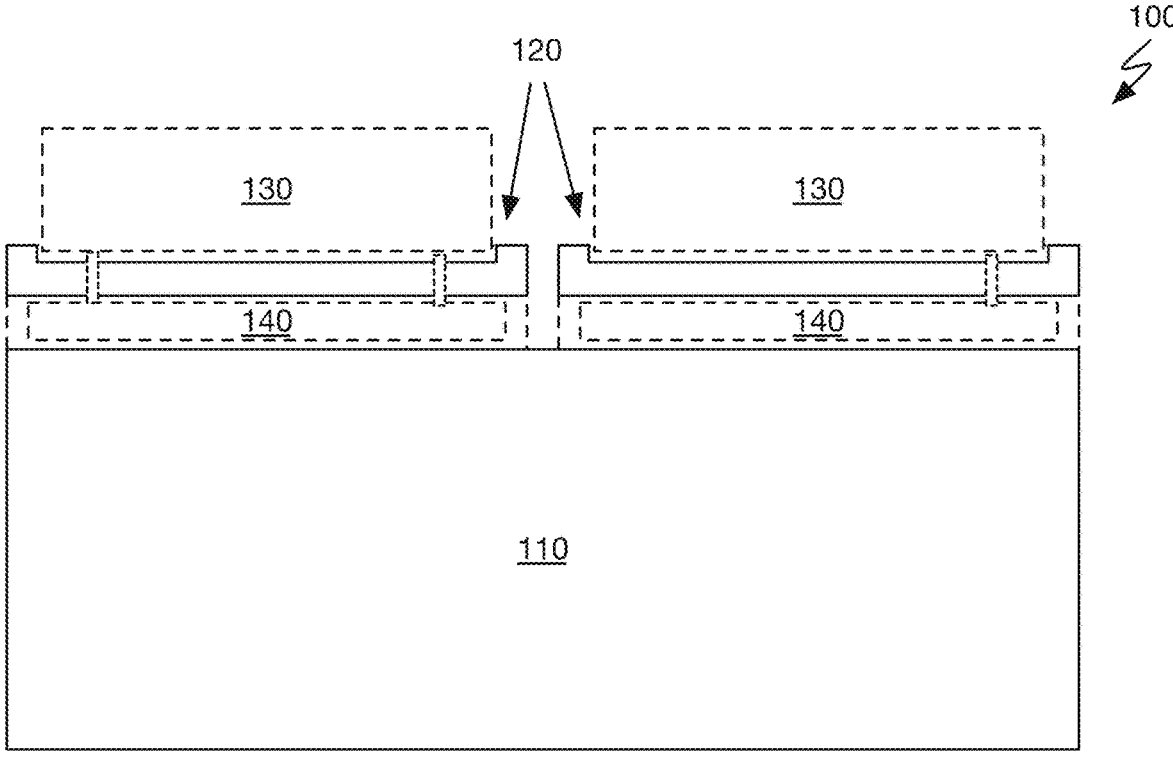

The set of support elements 120 is mounted relative to the base structure so as to define a pick region 104 and a refill region 106, the pick region opposite the refill region along a longitudinal axis 102 (e.g., an example is shown in FIG. 2). The pick region 104 is preferably below a workspace of a robotic assembly system, with a boundary plane of the workspace substantially intersecting a lateral support element 114 (and/or offset from a lateral support element by less than a threshold deviation, such as less than 25 mm, less than 10 mm, etc.). Such arrangements can be beneficial as they may enable a human operator to access a foodstuff bin in the pick region without crossing the workspace boundary (e.g., of the foodstuff assembly system) which may allow operators to access the foodstuff bin while the robotic assembly system continues to operate. Likewise, the refill region can be beyond the workspace (e.g., within a notional refill space which does not include or intersect the task space; an example is shown in FIGS. 1 and 5B), and/or can be otherwise arranged relative to the workspace. As an example, a vertical projection of the refill region does not intersect the workspace. As a second example, nonexclusive with the first, a vertical projection of the workspace overlaps the pick region(s) and is nonoverlapping with the refill region(s). As a third example, the frame and/or robot arm can define a workspace and a refill space, wherein the refill space does not intersect the workspace, wherein, in a pick arrangement, an interior volume of the foodstuff bin(s) intersects the workspace, wherein, in a refill arrangement, the foodstuff bins are within the refill space.

Figure 12:
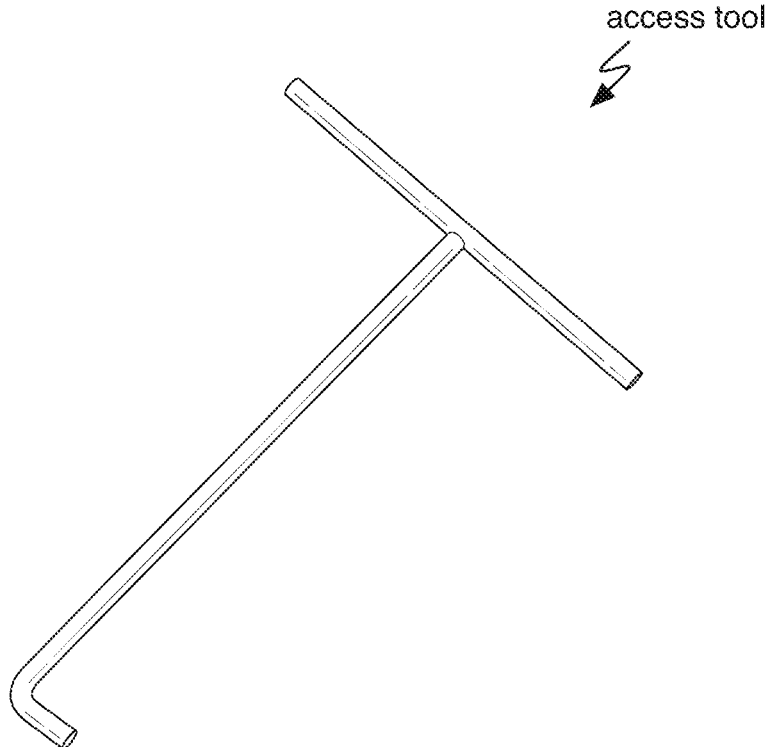
FIG. 12 is an example of an access tool to facilitate manual access to a foodstuff bin without entering a robot task space.

As an example, an ingredient bin can be transitioned between a pick region and a refill region (and vice versa) by lifting one end of the bin over a (lateral) support element and sliding the bin longitudinally (e.g., between longitudinal support elements; along a longitudinal path lying) until it nests into place between a pair lateral support elements. The support and retention provided by the support elements may convert an awkward and/or heavy two-handed lift into a one-handed task (e.g., which may be performed within threshold range of a standard work surface height; which may be performed using a single-handed tool, such as illustrated in the example shown in FIG. 12; by grasping a proximal feature/lip of the foodstuff bin, which may protrude beyond the workspace and/or remain within the refill space; etc.), which can be less burdensome to perform rapidly and/or repetitively. For example, a foodstuff bin can be manually slidable between the refill region and the pick region (and/or vice versa) along a path (e.g., traced by a centroid, longitudinal path lying in a midsagittal plane between the longitudinal support elements, etc.), wherein the support elements (e.g., retention structures) are configured to at least partially laterally constrain the first foodstuff bins in the first refill region, the first pick region, and all liminal positions along the first path.

Figure 4A:
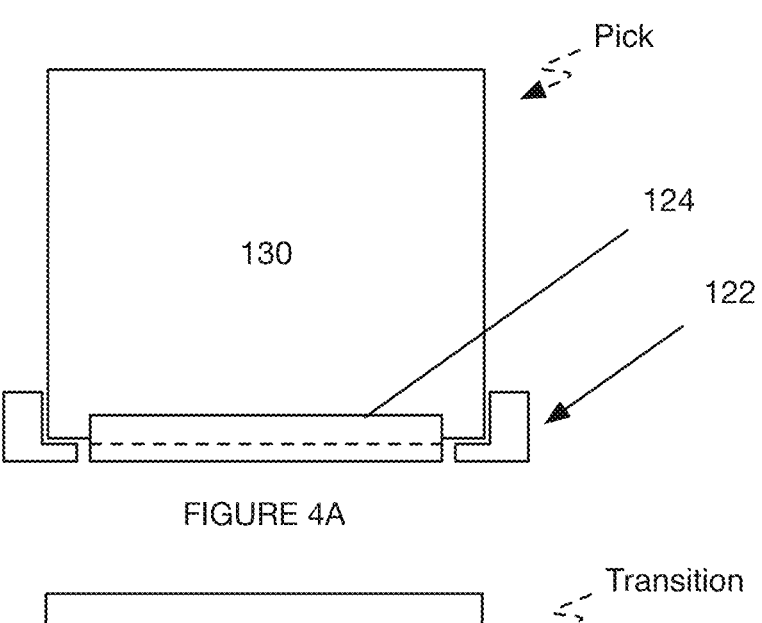
FIGS. 4A-4C are partial front-view schematic representations of a variant of the system in a first, second, and third configuration corresponding to an arrangement of the foodstuff bin: in a pick region, transitional region (between the pick region and refill region), and a refill region, respectively.

In the pick configuration (an example is shown in FIG. 4A, a second example is shown in FIGS. 8A-B), a base plane of a foodstuff bin is supported by the pick region and the foodstuff bin is retained by the support elements within a threshold deviation from a predetermined and/or prior calibrated position (e.g., known positions within an imaging coordinate frame, within a predetermined tolerance, etc.). The set of retention elements can partially (or fully) encircle, surround, and/or circumscribe the base of the foodstuff bin at the pick region (e.g., relative to a base plane of the foodstuff bin in the pick configuration). As an example, the set of support elements and/or retention surfaces thereof can be configured to at least partially self-align a foodstuff bin within a threshold tolerance of a predetermined and/or pre-calibrated pose (e.g., under influence of gravity).

Figure 4B:
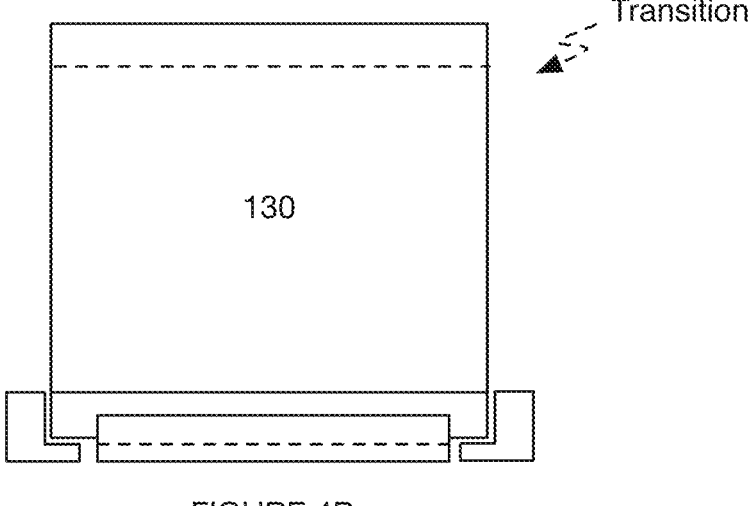

In transitional configurations (e.g., between the refill configuration and pick configuration; an example is shown in FIG. 4B), the base of the foodstuff bin can be inclined (e.g., define a non-zero pitch angle) to rest upon and slide over a lateral support element (e.g., between the pick region and the refill region), while the longitudinal support elements maintain alignment with the longitudinal axis at one end of the container.

Figure 4C:
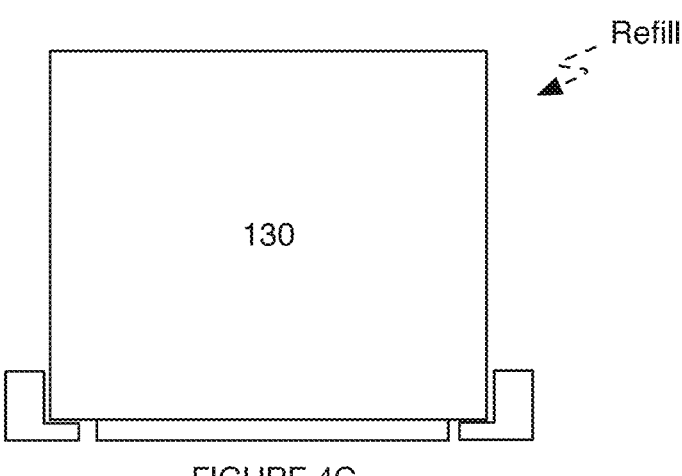

In the refill configuration (an example is shown in FIG. 9A-B), a base plane of the foodstuff bin is supported by the refill region and substantially aligned with a longitudinal axis of the pick region. In variants, the refill region can be coplanar with the pick region (e.g., an example is shown in FIG. 4C). Alternatively, the refill region can be pitched (e.g., angled upward; inclined) relative to the longitudinal axis and/or vertically offset from the pick region (examples are shown in FIGS. 10A-B and FIG. 11), which may minimize the manual work required to return a filled container to the pick region. Additionally, a slope/incline of the refill region may facilitate water runoff and/or avoid aggregation of standing water during cleaning or operation. For example, a surface normal vector of a superior surface of the refill region can define a zenith angle of (and/or be inclined/ pitched by): less than 1 degrees, 1 degree, 1.1 degree, 1.2 degrees, 1.5 degrees, 2 degrees, 3 degrees, 3.1 degrees, 3.2 degrees, 3.5 degrees, 5 degrees, 7 degrees, 10 degrees, greater than 10 degrees, any open or closed range bounded by the aforementioned values, and/or any other suitable angle. As an example, surfaces may generally be angled by about 1 degree to facilitate water runoff. However, any suitable set of superior surfaces of the frame, base structure (refill table), support elements, foodstuff bins, or other suitable components can be inclined, convex (e.g., concave down superior surface), rounded, arcuate, and/or otherwise formed to facilitate fluid runoff/drainage. Additionally, floors in industrial assembly contexts may likewise be angled (e.g., to facilitate runoff), sometimes in arbitrary directions, and it may thus be beneficial to have a steeper incline of superior surfaces which may be repeatedly cleaned, such as between 2 degrees and 10 degrees relative to the vertical axis, and more preferably between 3 degrees and 5 degrees; however, surfaces may be otherwise inclined, rounded, or otherwise implemented to facilitate fluid runoff.

Figure 5A:
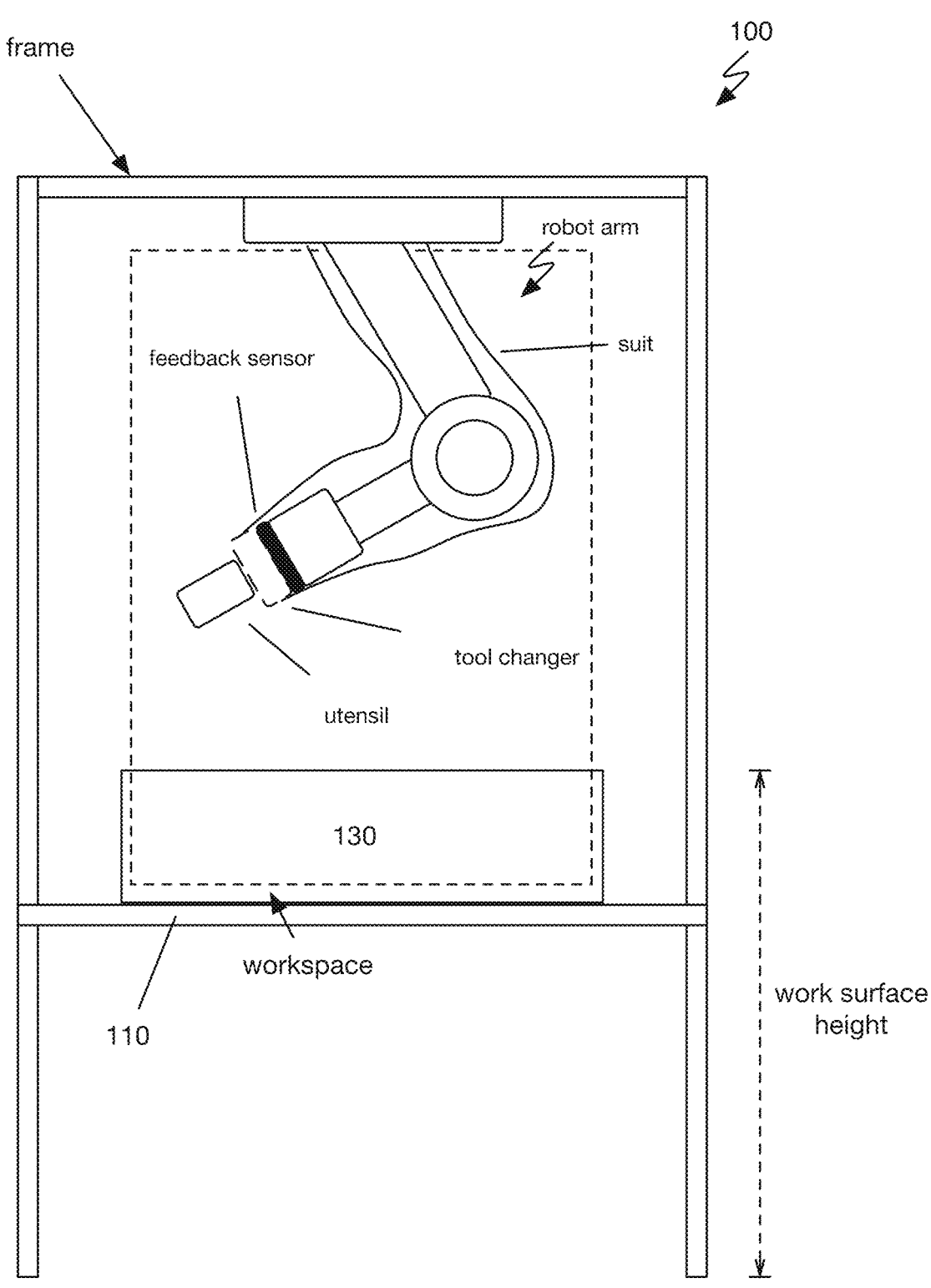
FIGS. 5A-5B are a front view representation and a side view representation of a first and second variant of the system, respectively.
Figure 5B:
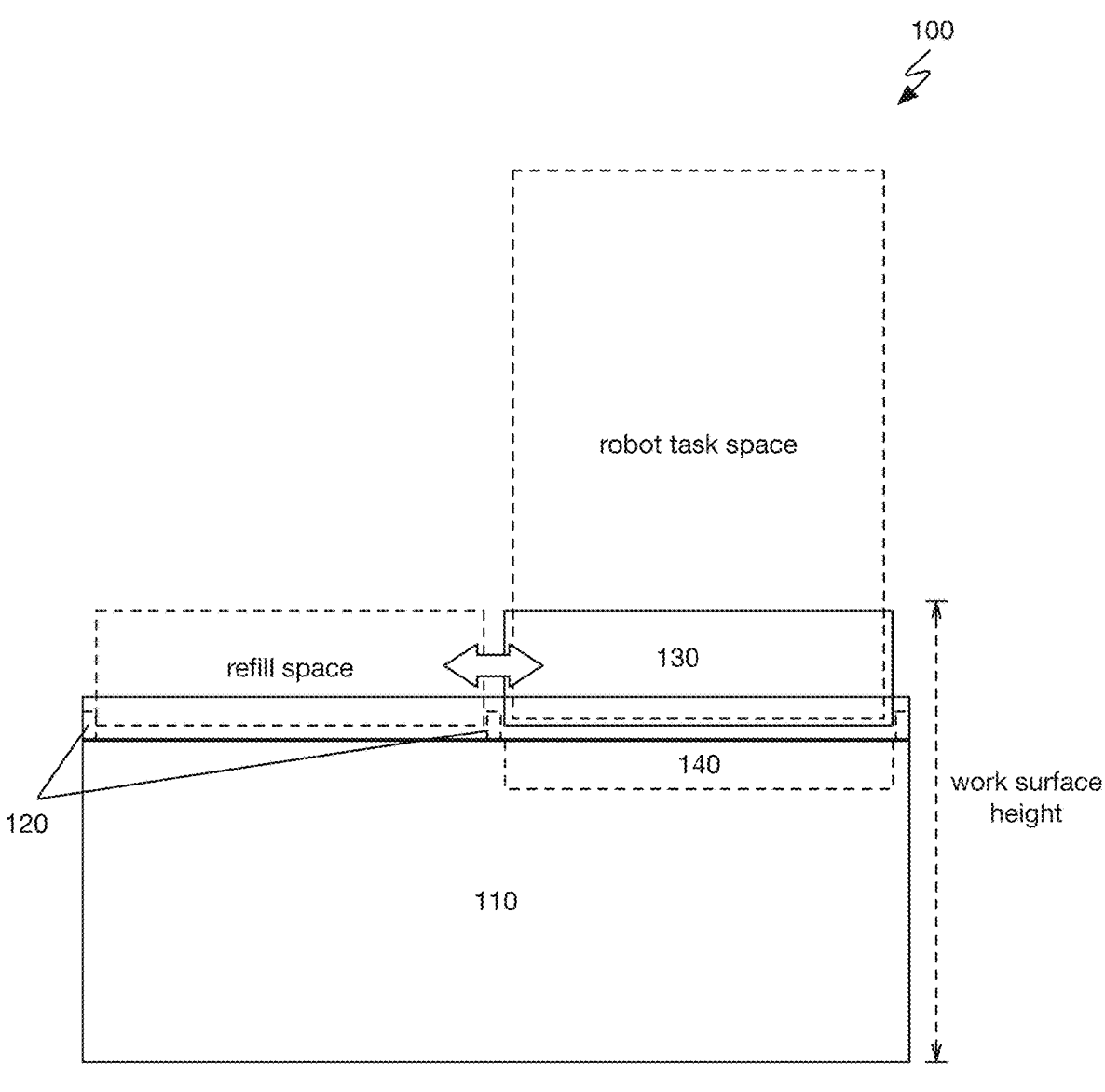

In the refill configuration, a top plane of the foodstuff bin is preferably within a predetermined range of a standard work surface height (e.g., the refill region vertically offset from a work surface height by a depth of the foodstuff bin; an example is shown in FIG. 5A-B); however, a bottom plane of the foodstuff bins can alternatively be at a standard work surface height, the foodstuff bin can (vertically) span a standard work surface height, and/or the bins can be otherwise positioned at any other suitable height.

Figure 13A:
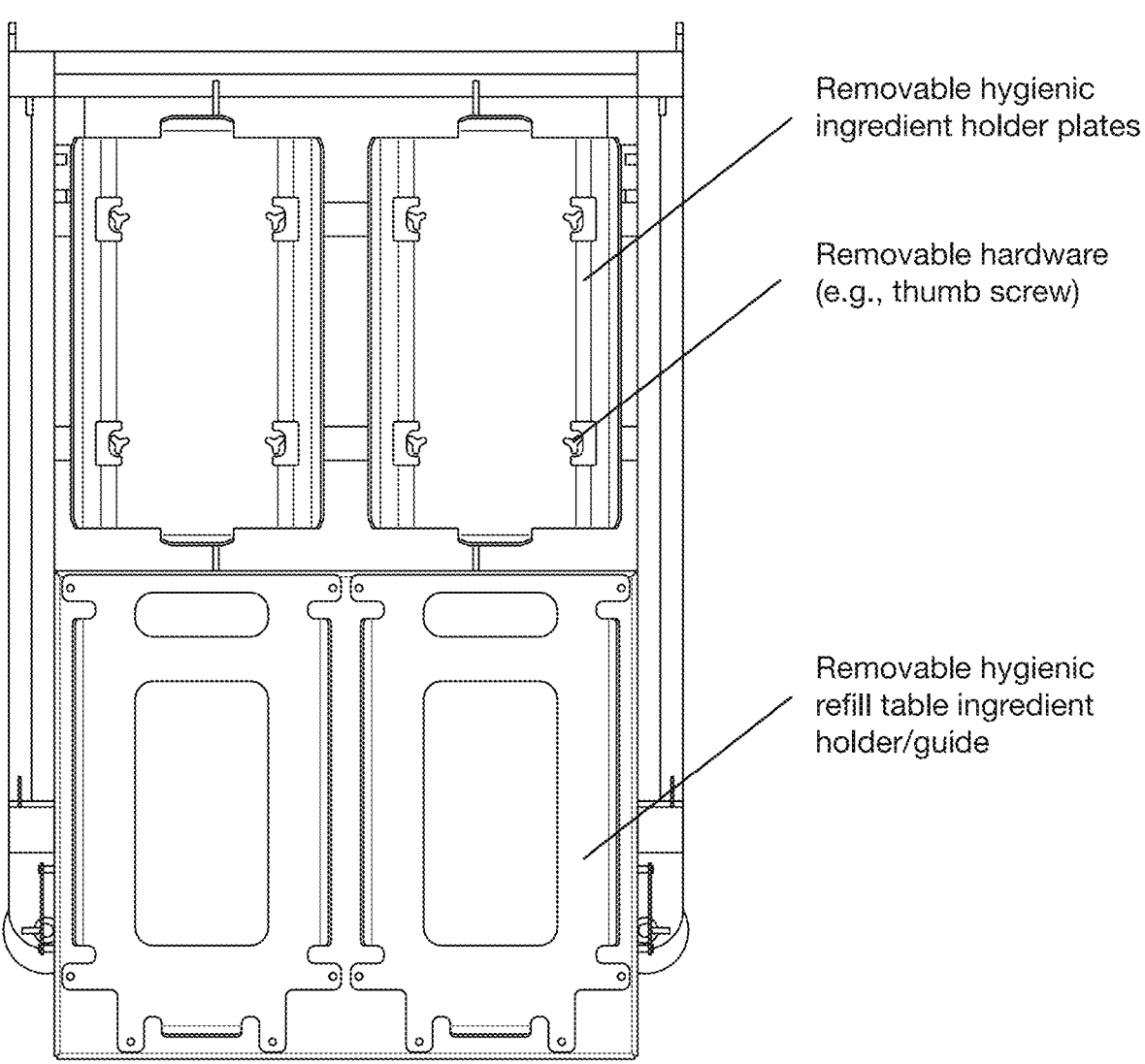
FIGS. 13A and 13B are a first and second 3D section view of a first and second variant of the system, respectively.
Figure 13B:
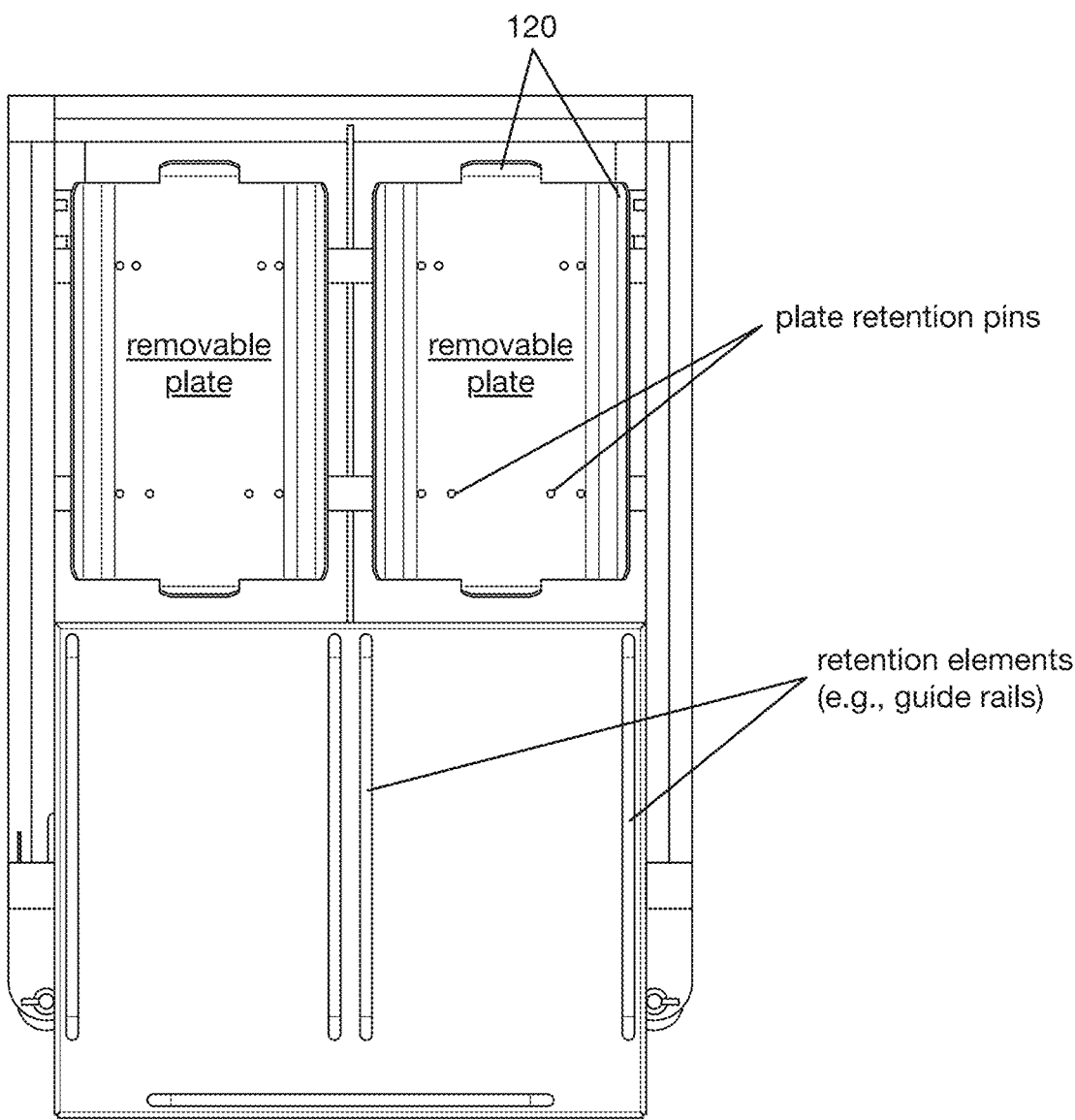
Figure 14A:
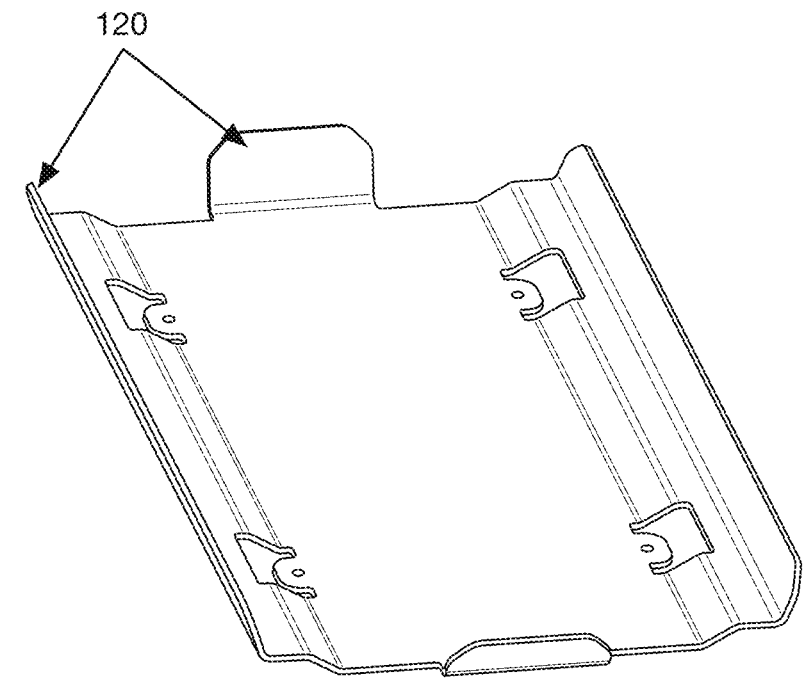
FIG. 14A is a trimetric view of a set of support elements in a variant of the system.
Figure 14B:
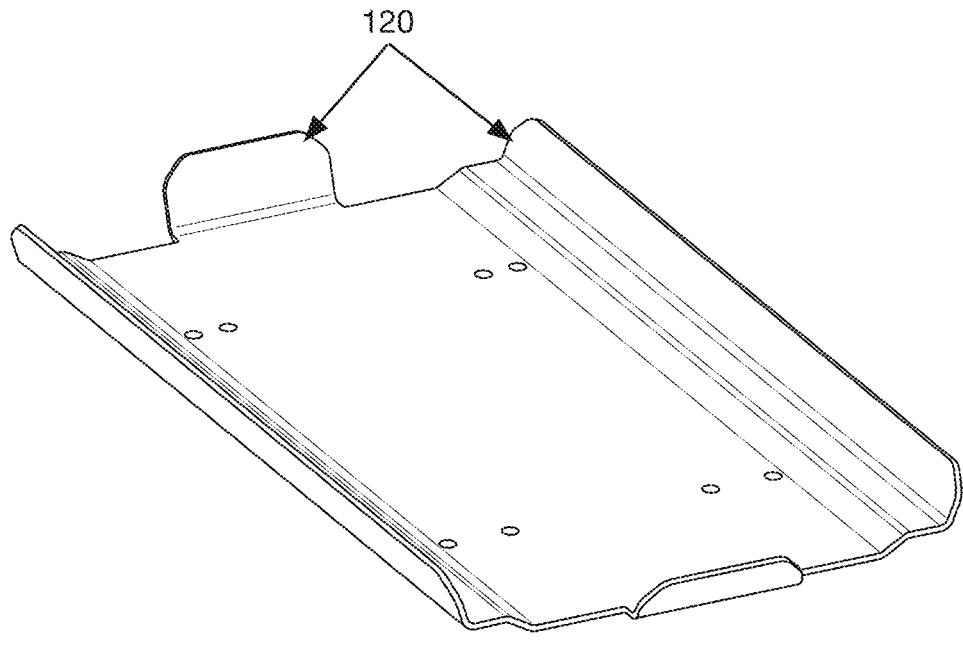
FIG. 14B is a trimetric view of a set of support elements in a variant of the system.
Figure 15:
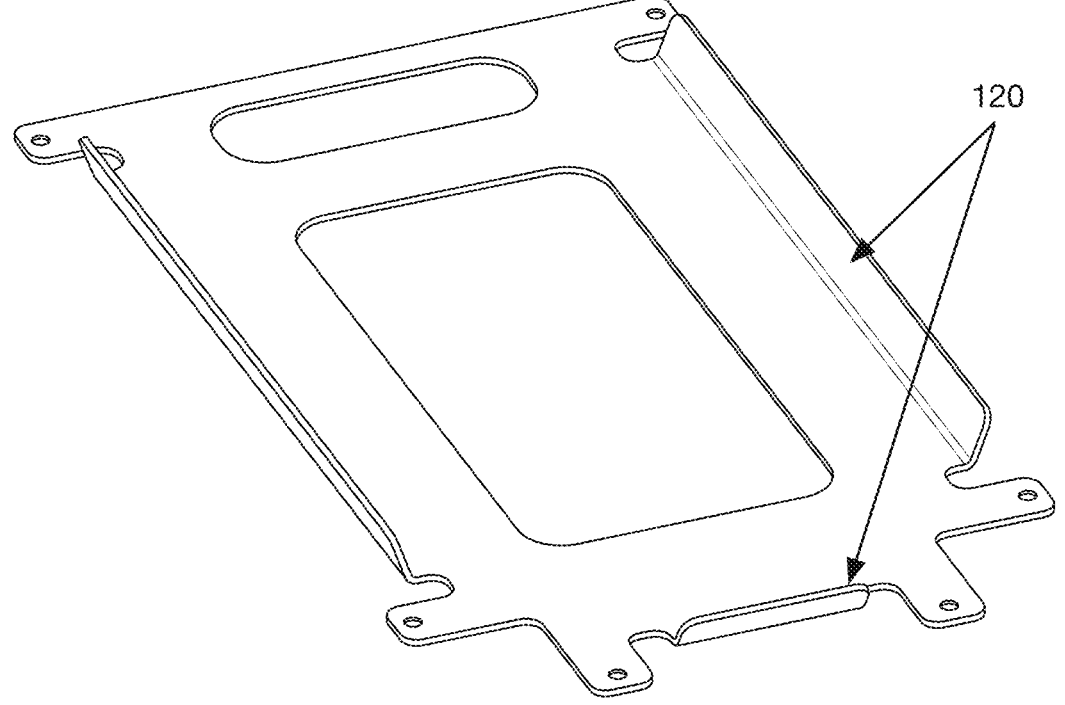
FIG. 15 is a trimetric view of a set of support elements in a variant of the system.
Figure 16:
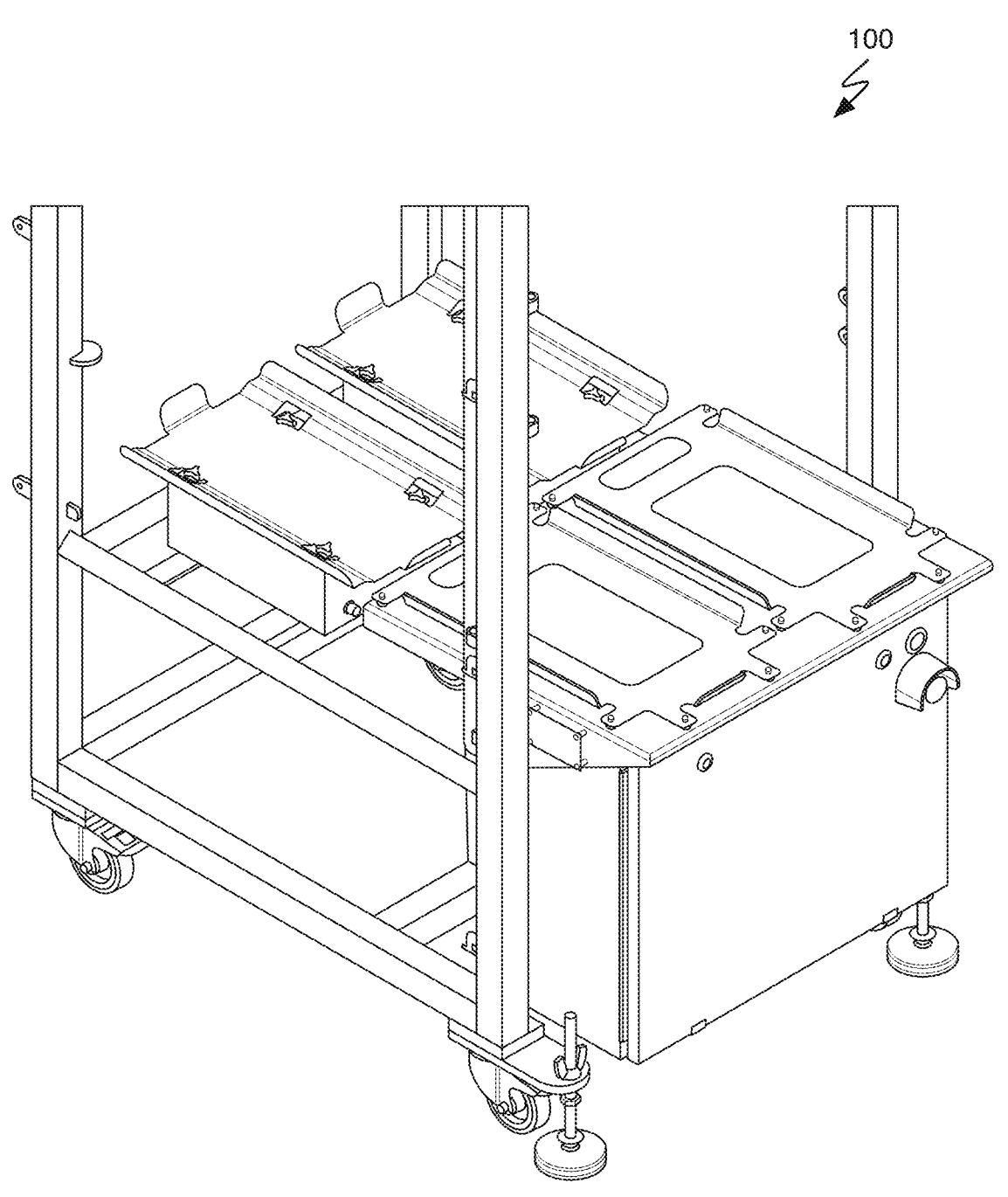
FIG. 16 is an isometric view of a variant of the system.
Figure 17:
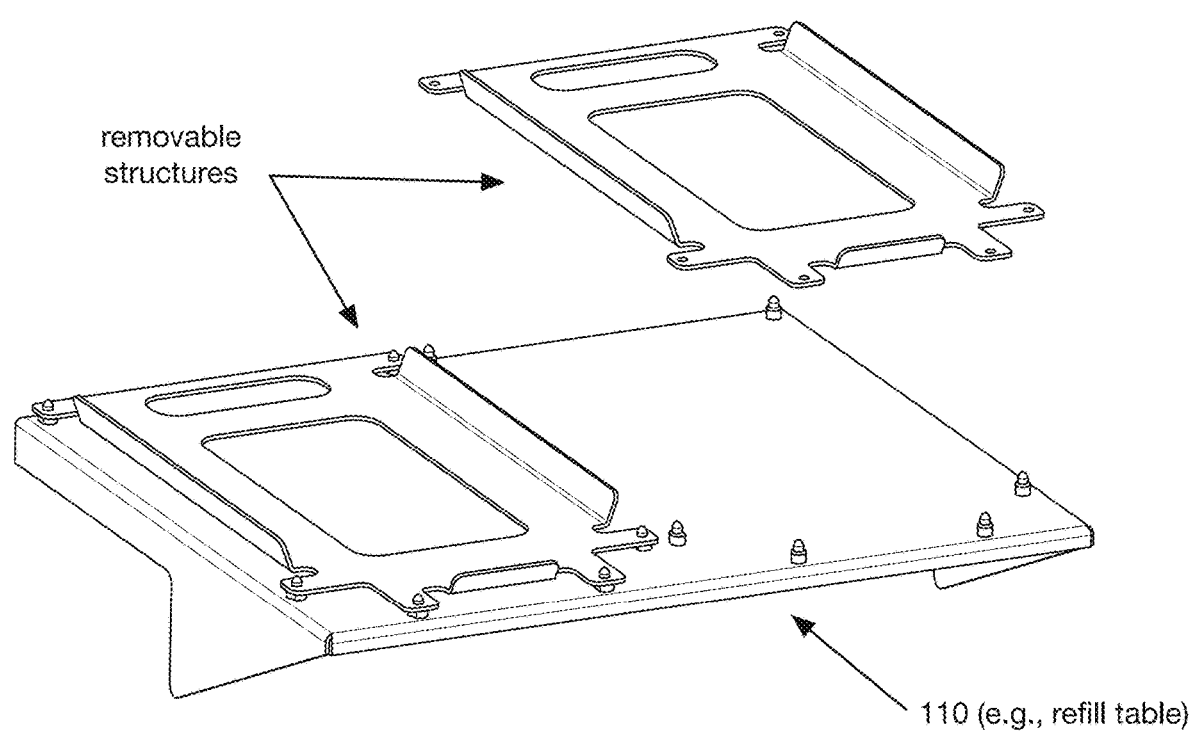
FIG. 17 is a partial 3D view of a variant of the system illustrating a support structure and removable support elements.

The support elements 120 can be integrated into the base structure and/or frame (e.g., wherein the support elements are configured to be cleaned in place), fixedly mounted to the base/frame, removably secured (e.g., facilitating remote cleaning and/or dishwashing; via thumbscrews or other fasteners; an example is shown in FIG. 13A; a second example is shown in FIG. 14A; a third example is shown in FIG. 14B), retained relative to the frame (e.g., pinned, clipped into position, etc.), and/or otherwise assembled with the base structure and/or frame. In a first set of variants, support elements can be individually mounted, fastened, or affixed to the base structure (refill table). In a second set of variants, support elements can be integrated into a removable body, which is removably assembled into position relative to the frame. For example, a plurality of support elements can be integrated into a unitary body (e.g., for each pick region, each refill region, each foodstuff bin, etc.) which can be mounted with a set of fasteners (e.g., toolless fasteners, such as thumbscrews, locking clamps, spring clips, etc.), which can facilitate (toolless) manual removal. In a third set of variants, the support elements can be retained (e.g., in a lateral plane, substantially orthogonal to a gravity vector) by a set of (vertical) retention pins. In such variants, the unitary body and the support elements can 'lift away' without tools or removable hardware/fasteners, which may reduce the component count and/or the number of removable parts to clean and manage during servicing. As an example, a subset of the set of support elements are integrated into a body of the base structure which includes an integrated force sensor configured to support a foodstuff bin with a plurality of pins extending through the body, wherein the body is manually removable and unconstrained in an upwards direction relative to the vertical axis.

In an example, the set of retention elements are configured to at least partially self-align a foodstuff bin (e.g., under influence of gravity) within the pick region or the refill region.

In variants, the refill region can be below a human machine interface (HMI), such as a touchscreen interface, display, or other HMI component(s) of the foodstuff assembly system (e.g., directly below the HMI; intersected by a vertical projection of the HMI, etc.), which may facilitate user access to the foodstuff bin (e.g., within the refill region) while a user is engaging with the HMI and/or viewing information displayed on the HMI. For example, the HMI may be around eye level for a user of normal stature (e.g., 5th percentile female to 95th percentile male, etc.) while the refill region is closer to a standard work surface height, with both the refill region and the HMI located outside of the workspace of the robotic assembly system and accessible to the user collaborating with the robotic assembly system.

However, the system can include any other suitable set of support elements in any suitable arrangement.

The system 100 can optionally include a force sensor 140 which functions to provide feedback sensing of ingredient weights and/or pick amounts. The force sensor can be a scale, load cell, force transducer, strain gauge, optical force sensor, Wheatstone bridge, and/or any other suitable force/weight sensor. The force sensor is preferably mounted to and/or integrated into the base structure and substantially parallel with the pick region, but can be otherwise suitably integrated. The system preferably includes a single force sensor per pick region, with all support elements bounding the pick region mounted to and fully supported by the force sensor, but can alternatively include exactly one force sensor (e.g., supporting all pick regions), and/or any other suitable arrangement of force sensors.

However, the system can alternatively include a removable force sensor and/or altogether exclude a force sensor.

In a first variant, a pair of lateral support elements and a pair of longitudinal support elements can be mounted to and structurally supported by a weighing surface of a force sensor assembly (e.g., scale), with the pick region bounded by the support elements (e.g., an example is shown in FIG. 2A). In the pick configuration, a foodstuff bin can rest in the pick region, which can allow the force sensor to measure changes the weight of ingredients within the foodstuff bin (e.g., absolute ingredient weight and/or relative ingredient weight; change in weight resulting from an ingredient pick, etc.).

In a second variant, the support elements and a force sensor assembly can be separately mounted to the base structure (e.g., an example is shown in FIG. 2B). For example, the support elements can circumscribe the weigh surface of a scale and extend above the weighing surface, with the support elements and the weigh surface of the scale cooperatively defining a pick region (e.g., the support elements can support a foodstuff bin during transition into the pick region and/or align the foodstuff bin during transition into the pick configuration; the support elements can constrain lateral and/or longitudinal translations of the foodstuff bin; the weigh surface can support the weight and/or vertical load of the foodstuff bin).

In variants, such as those which include a force sensor, it can be advantageous for the weight of the foodstuff bin to be supported by the base of the foodstuff bin, rather than a peripheral feature an upper lip of the foodstuff bin (e.g., such as a handle or flange). Such variants can simplify the number and arrangement of components utilized for weight sensing, since the weight sensing may occur at a single (e.g., planar) surface and/or a set of points thereof (e.g., with an array of pins, extending through a removable body including the set of retention features), as opposed to a region with an internal cavity or multiple (e.g., parallel and coplanar) surfaces.

However, in alternative variants, foodstuff bins can be supported and/or retained by the lip, and/or the system can be otherwise configured.

In an example, each integrated force sensor is configured to support a foodstuff bin with a plurality of pins extending through a body comprising a subset of the retention features (e.g., wherein the body is manually removable and unconstrained in an upwards direction relative to the vertical axis; wherein the pins are configured to fully support the foodstuff bin in the pick configuration).

In a first alternative variant, foodstuff bins such as hotel pans can be supported within prep tables (e.g., in an array/grid) by an upper lip and retained proximal to the upper end of the hotel pan. However, this arrangement can significantly increase the challenge of force sensor integration (e.g., normal force needs to be determined for components entirely supporting the lip). Additionally, in order to remove a hotel pan from a prep table where it is retained on all side walls at the lip, the base of the hotel pan is manually lifted up by its full height (e.g., 20 cm; height from underside of lip to base; generally using two hands) to be removed from the surrounding structure. Conversely, in variants of the system where foodstuff bins are supported by their base and retained (and/or supported by) the support elements, the foodstuff bins can be removed (e.g., transitioned out of a pick configuration) by raising one end of the base over one support element (e.g., raising the base about 2 cm; allowing the foodstuff bin to slide over the support element; the foodstuff bin may be raised one tenth of the height, using one hand, and/or using about half of the force). Additionally, the user experience and/or finger/tool access may be improved when the foodstuff bin can be lifted and/or accessed by a human via a different feature/surface than it rests upon (e.g., using a tool such as the access tool illustrated in FIG. 12). For example, a foodstuff bin (e.g., hotel pan) may rest upon and/or may be weighed using its base, but may be lifted by a peripheral lip at the upper end.

In a second alternative variant, foodstuff bins such as hotel pans or trays can be supported at a peripheral lip by rails which allow them to slide longitudinally (e.g., cabinet slides, passive rails such as those on a pan rack, etc.). However, this arrangement can significantly increase the challenge of force sensor integration (e.g., normal force needs to be determined for components entirely supporting the lip, which in some cases may be cantilevered and/or include multiple separate components supporting the weight). Additionally, such arrangements may not effectively constrain the foodstuff bin longitudinally and/or may introduce additional cleaning challenges.

However, the system can include any other suitable components.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A foodstuff assembly robot comprising:

a frame;

a platform mounted to the frame and defining a set of support regions comprising:
  a first and second refill region proximal a first longitudinal end of the frame; and
  a first and second pick region distal to the first longitudinal end of the frame, and longitudinally aligned with the first and second refill regions, respectively;

a first foodstuff bin manually slidable between the first refill region and the first pick region along a first linear path;

a second foodstuff bin manually slidable between the second refill region and the second pick region along a second linear path;

a first set of retention structures connected to the platform, wherein the first set of retention structures define the first linear path, wherein the first linear path directly links the first refill region to the first pick region, wherein the first set of retention structures are configured to at least partially laterally constrain the first foodstuff bin in the first refill region, the first pick region, and all liminal positions along the first path;

a second set of retention structures connected to the platform, wherein the second set of retention structures define the second linear path, wherein the second linear path directly links the second refill region to the second pick region, wherein the second set of retention structures are configured to at least partially laterally constrain the second foodstuff bin in the second refill region, the second pick region, and all liminal positions along the second path; and a robot arm mounted to the frame above the platform and defining a workspace reachable by the robot arm, a vertical projection of the workspace overlapping the first and second pick regions and nonoverlapping with the first and second refill regions.

2. A system comprising:

a robotic foodstuff assembly module comprising: a structural frame and a collaborative robot arm mounted to the structural frame, the robotic foodstuff assembly module defining a workspace reachable by the collaborative robot arm having a longitudinal axis, a lateral axis, and a vertical axis;

a base structure mounted to the frame below the robot arm relative to the vertical axis and configured to support a plurality of foodstuff bins; and a set of retention elements coupled relative to the base structure and defining a pick region of the base structure and a refill region of the base structure, the set of retention elements comprising:
  a set of lateral support elements each having a long axis substantially parallel to the lateral axis, the set of lateral support elements comprising a first lateral support element which separates the pick region from the refill region across a thickness of the first lateral support element; and
  a set of longitudinal elements each having a long axis substantially parallel to the longitudinal axis, the set of longitudinal elements comprising pairs of longitudinal elements offset by a foodstuff bin width;

wherein the pick region is directly below the workspace, is below a base of the collaborative robot arm, and is configured to support a foodstuff bin of the plurality of foodstuff bins with an interior volume of a foodstuff bin intersecting the workspace, wherein the refill region is configured to support a foodstuff bin outside the workspace, wherein the set of retention elements are configured to self-align the foodstuff bin within the pick region or the refill region.

3. The system of claim 2, wherein the base structure comprises an integrated force sensor configured to independently support a foodstuff bin at the pick region.

4. The system of claim 3, wherein a subset of the set of retention elements are integrated into a body of the base structure, wherein the integrated force sensor is configured to support a foodstuff bin with a plurality of pins extending through the body, wherein the body is manually removable and unconstrained in an upwards direction relative to the vertical axis.

5. The system of claim 2, wherein the first lateral support element is configured to enable single-handed, sliding transitions of a foodstuff bin between the pick region and the refill region.

6. The system of claim 2, wherein the refill region is inclined relative to the pick region.

7. The system of claim 6, wherein a surface normal vector of a superior surface of the refill region defines a zenith angle between 2 and 10 degrees relative to the vertical axis.

8. The system of claim 2, wherein a vertical projection of each refill region does not intersect the workspace.

9. The system of claim 2, wherein the set of retention elements are configured to at least partially self-align a foodstuff bin under influence of gravity within the pick region or the refill region.

10. The system of claim 2, wherein the set of retention elements at least partially circumscribe a base of each foodstuff bin at the pick region.

11. The system of claim 2, wherein the foodstuff assembly module is configured to pick, with the collaborative robot arm, foodstuff ingredients from a first foodstuff bin of the plurality of foodstuff bins contemporaneously with an operator manually transitioning a second foodstuff bin of the plurality of foodstuff bins between the pick region and the refill region.

12. The system of claim 2, further comprising a second set of retention elements which is substantially symmetric with the set of retention elements about a midsagittal plane of the robotic foodstuff assembly module.

13. The system of claim 2, wherein the lateral and longitudinal elements align and retain foodstuff bins.

14. The system of claim 2, wherein a geometry of the pick region is substantially similar to a base geometry of each foodstuff bin of the plurality of foodstuff bins.

15. The system of claim 2, wherein the pick region is directly below a base of the collaborative robot arm.

16. The system of claim 2, wherein the set of retention elements are rigidly mounted relative to the base structure.

* * * * *